US007093005B2

(12) United States Patent
Patterson

(10) Patent No.: US 7,093,005 B2
(45) Date of Patent: *Aug. 15, 2006

(54) GRAPHICAL EDITOR FOR DEFINING AND CREATING A COMPUTER SYSTEM

(75) Inventor: Martin Patterson, Mountain View, CA (US)

(73) Assignee: Terraspring, Inc., Fremont, CA (US)

( * ) Notice: Subject to any disclaimer, the term of this patent is extended or adjusted under 35 U.S.C. 154(b) by 835 days.

This patent is subject to a terminal disclaimer.

(21) Appl. No.: 09/863,945

(22) Filed: May 22, 2001

(65) Prior Publication Data

US 2002/0052941 A1    May 2, 2002

Related U.S. Application Data

(63) Continuation-in-part of application No. 09/502,170, filed on Feb. 11, 2000, now Pat. No. 6,779,016.

(60) Provisional application No. 60/212,925, filed on Jun. 20, 2000, now abandoned.

(51) Int. Cl.
*G06F 15/177* (2006.01)
(52) U.S. Cl. .................. 709/220; 709/221; 715/513
(58) Field of Classification Search ............ 709/201–3, 709/220–224, 249, 250, 223–6; 715/513
See application file for complete search history.

(56) References Cited

U.S. PATENT DOCUMENTS

| 4,591,967 A | 5/1986 | Mattes et al. |
| 5,163,130 A | 11/1992 | Hullot |
| 5,504,670 A | 4/1996 | Barth et al. |

(Continued)

FOREIGN PATENT DOCUMENTS

EP    0 262 750 A2    4/1988

(Continued)

OTHER PUBLICATIONS

Microsoft Press computer Dictionary, Third Edition, Microsoft Press Publishing, 1997, p. 197.*

(Continued)

*Primary Examiner*—Krisna Lim
(74) *Attorney, Agent, or Firm*—Hickman Palermo Truong & Becker, LLP; Edward A. Becker

(57) ABSTRACT

A method and apparatus for defining and deploying a networked computer system features creating and storing a graphical representation using a graphical editor to drag and drop icons representing computing elements and network elements into a workspace, such that a logical configuration of the networked computer system is represented by the graphical representation. A corresponding textual representation of the computer system is automatically created and stored according to a structured markup language. Based on the textual representation, one or more commands are generated for configuring an operable computer system that conforms to the logical configuration. The commands may be directed to one or more devices that are interconnected to one or more computing elements and storage devices, to instruct the devices to logically connect the computing elements and storage devices into the computer system. In one embodiment, a graphical representation of the logical configuration of the networked computer system is created, based on a user selection from a palette of one or more graphical icons that represent computing elements and network elements of the computer system, and a user selection of graphical interconnections of the icons. As a result, a real-world virtual server farm or data center may be created and deployed.

41 Claims, 18 Drawing Sheets

U.S. PATENT DOCUMENTS

| | | | |
|---|---|---|---|
| 5,574,914 A | 11/1996 | Hancock et al. | |
| 5,590,284 A | 12/1996 | Crosetto | |
| 5,659,786 A | 8/1997 | George et al. | |
| 5,751,967 A | 5/1998 | Raab et al. | |
| 5,819,042 A | 10/1998 | Hansen | |
| 5,821,937 A * | 10/1998 | Tonelli et al. | 715/853 |
| 5,832,522 A | 11/1998 | Blickenstaff et al. | |
| 5,951,683 A | 9/1999 | Yuuki et al. | |
| 5,974,563 A | 10/1999 | Beeler, Jr. | |
| 6,081,883 A | 6/2000 | Popelka et al. | |
| 6,182,139 B1 | 1/2001 | Brendel | |
| 6,212,559 B1 | 4/2001 | Bixler et al. | |
| 6,230,200 B1 | 5/2001 | Forecast et al. | |
| 6,260,109 B1 | 7/2001 | Ofer et al. | |
| 6,330,246 B1 | 12/2001 | Denning et al. | |
| 6,381,321 B1 | 4/2002 | Brown et al. | |
| 6,389,432 B1 | 5/2002 | Pothapragada et al. | |
| 6,393,466 B1 | 5/2002 | Hickman et al. | |
| 6,421,711 B1 | 7/2002 | Blumenau et al. | |
| 6,446,141 B1 | 9/2002 | Nolan et al. | |
| 6,466,559 B1 | 10/2002 | Johansson et al. | |
| 6,505,229 B1 | 1/2003 | Turner et al. | |
| 6,542,909 B1 | 4/2003 | Tamer et al. | |
| 6,597,956 B1 | 7/2003 | Aziz et al. | |
| 6,631,442 B1 | 10/2003 | Blumenau | |
| 6,640,278 B1 | 10/2003 | Nolan et al. | |
| 6,658,526 B1 | 12/2003 | Nguyen et al. | |
| 6,779,016 B1 | 8/2004 | Aziz et al. | |
| 2002/0052941 A1 | 5/2002 | Patterson | |

FOREIGN PATENT DOCUMENTS

| | | |
|---|---|---|
| EP | 0 490 624 A2 | 6/1992 |
| EP | 0 750 256 A2 | 12/1996 |
| EP | 0 791 881 A1 | 8/1997 |
| EP | 0 905 621 A1 | 3/1999 |
| EP | 0 917 056 A2 | 5/1999 |
| EP | 0935200 A1 | 8/1999 |
| WO | WO 97/49214 A1 | 12/1997 |
| WO | WO 99/57957 A2 | 11/1999 |
| WO | WO 00/29954 A1 | 5/2000 |

OTHER PUBLICATIONS

Rob Short, et al., "Windows NT Clusters for Availability and Scalability," 1997 IEEE, pp. 8-13.

Eric Prud'hommeaux, "XML-based HTTP Server Configuration Language," http://www.w3.org/1999/07/9-http-server-conf.html, Sep. 7, 1999, XP-002152599, pp. 1-5.

Nathan J. Muller, "Design and Conquer," Oct. 1996, *BYTE*, vol. 21, No. 10, XP 000683573, pp. 93-98.

Elliotte Rusty Harold, "XML: Extensible Markup Language," 1998, pp. 1-431.

Radek Vingralek, et al., "Snowball: Scalable Storage on Networks of Workstations with Balanced Load," pp. 117-156, Distributed and Parallel Databases, vol. 6, No. 2, Apr. 1998, XP-002162201.

Armando Fox, et al., "Cluster-Based Scalable Network Services," pp. 78-91, Operating Systems Review (SIGOPS), US, ACM Headquarter, New York, vol. 31, No. 5, Dec. 1, 1997, XP-000771023.

* cited by examiner

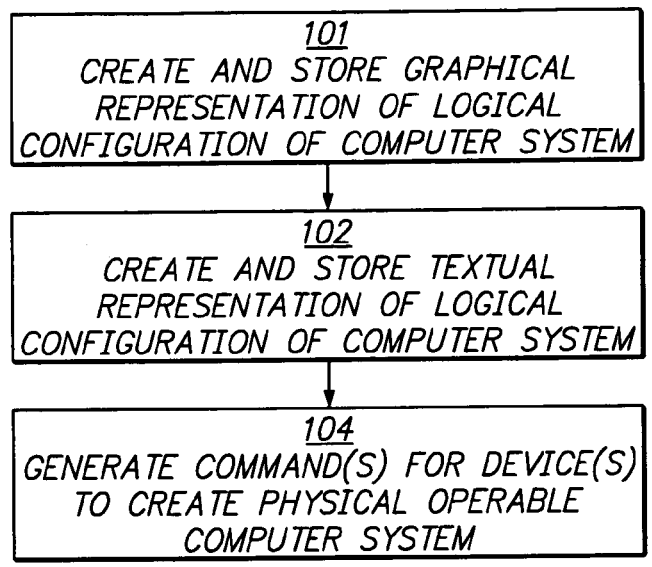
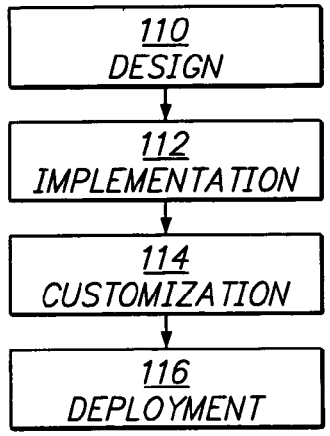
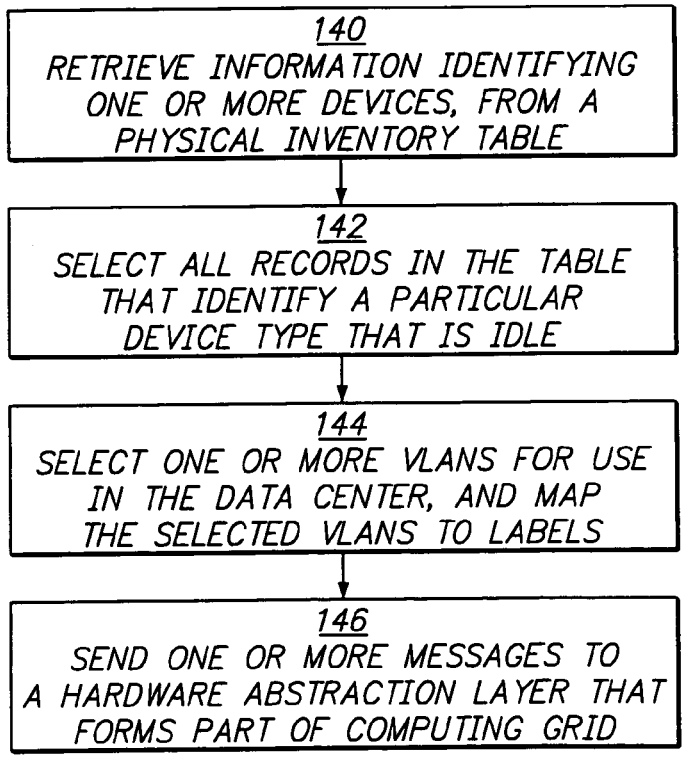

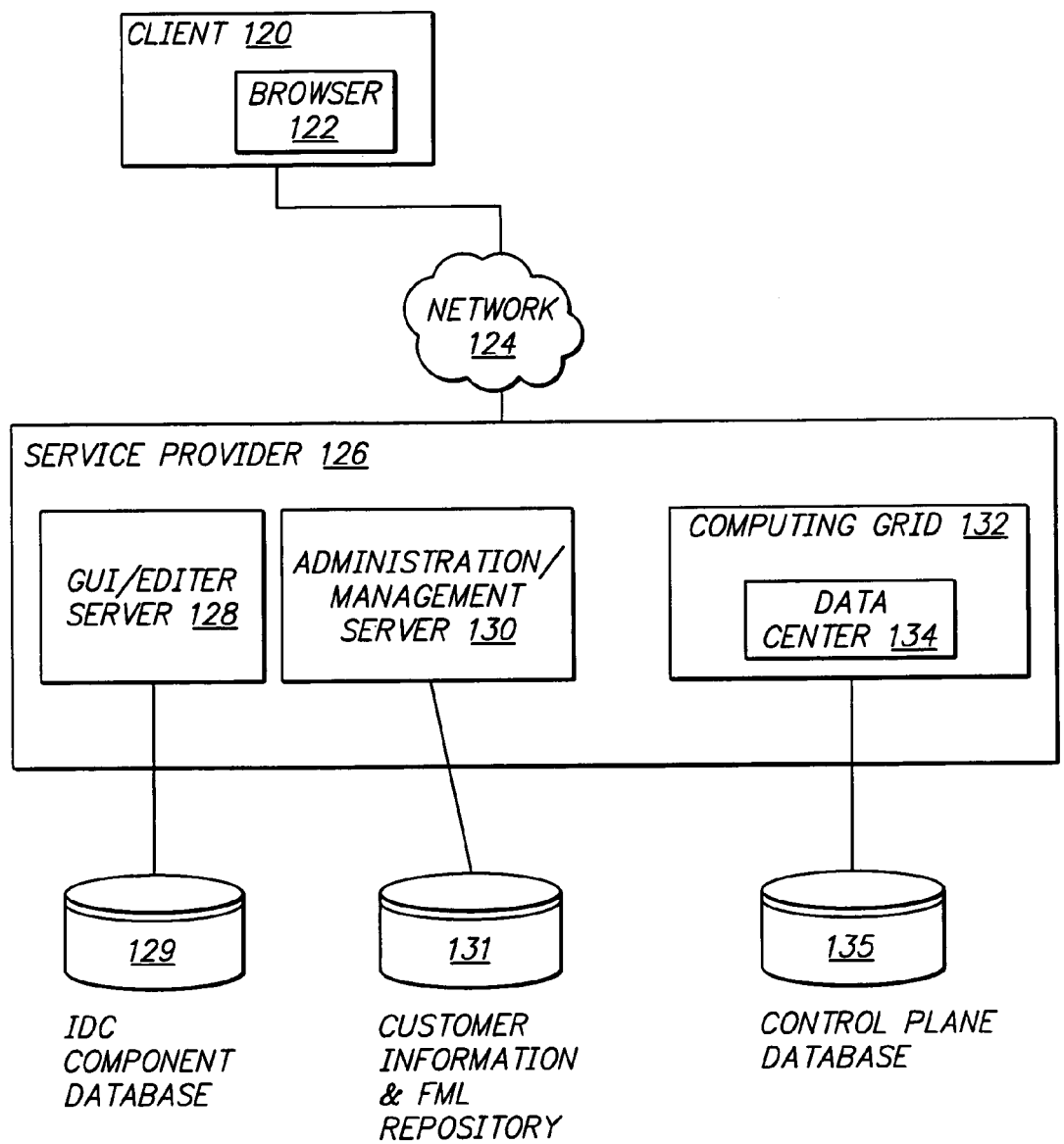

FIG. 4B

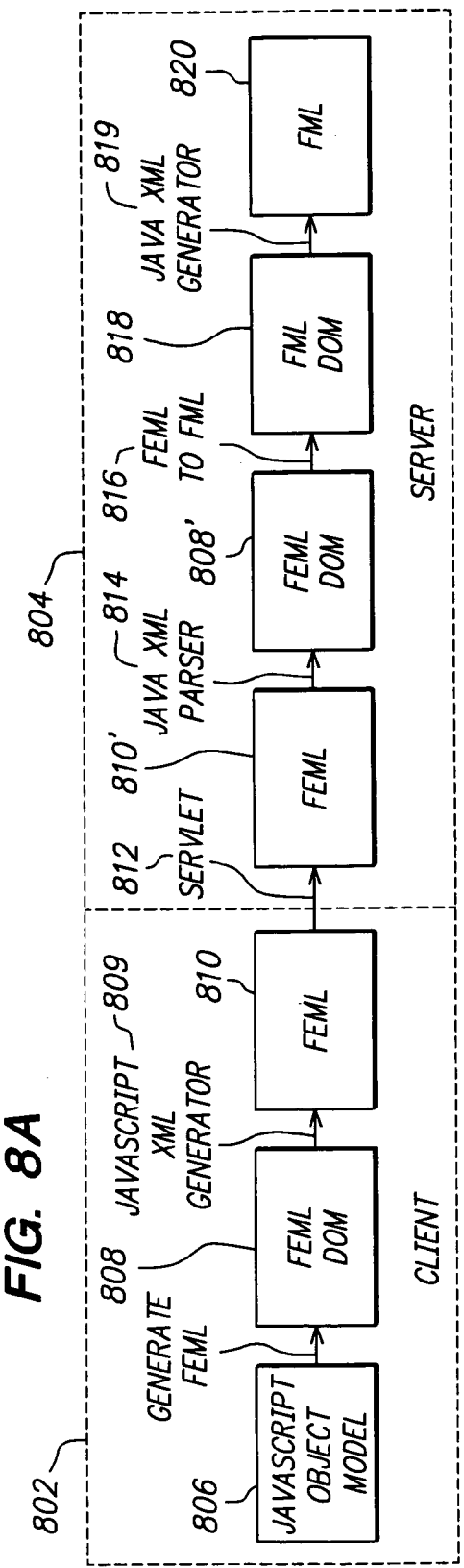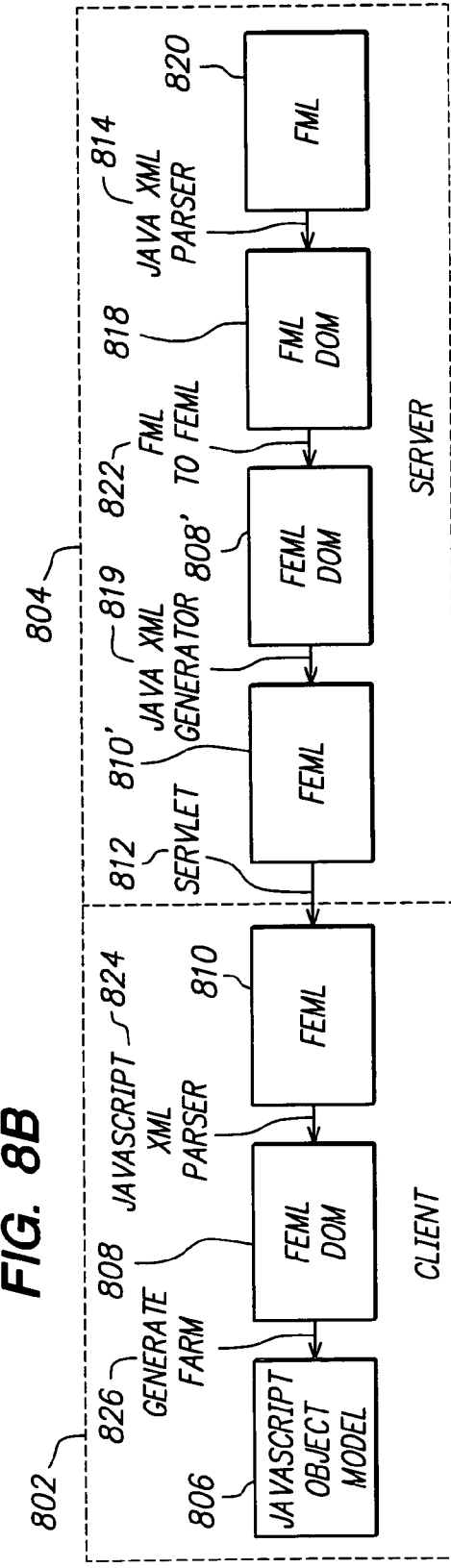

GRAPHICAL EDITOR FOR DEFINING AND CREATING A COMPUTER SYSTEM

RELATED APPLICATIONS; PRIORITY CLAIMS

This application is a continuation-in-part of, and domestic priority is claimed under 35 U.S.C. 120 from, application Ser. No. 09/502,170, filed Feb. 11, 2000, now issued as U.S. Pat. No. 6,779,016 on Aug. 17, 2004, entitled "Extensible Computing System," naming Ashar Aziz, et al., as inventors, the entire contents of which is hereby incorporated by reference as if fully set forth herein. Domestic priority is claimed under 35 U.S.C. 119 from prior Provisional application Ser. No. 60/212,925, filed Jun. 20, 2000, which is now abandoned, entitled "Symbolic Definition of a Virtual Computer System," and naming as inventors Ashar Aziz, et al., the entire contents of which is hereby incorporated by reference as if fully set forth herein.

FIELD OF THE INVENTION

The present invention generally relates to data processing in the field of visual programming and data networking. The invention relates more specifically to a method and apparatus for graphically defining and creating a computer system.

BACKGROUND OF THE INVENTION

Data processing users desire to have a flexible, extensible way to rapidly create and deploy complex computer systems and data centers that include a plurality of servers, one or more load balancers, firewalls, and other network elements. One method for creating such a system is described in co-pending U.S. patent application Ser. No. 09/502,170, filed Feb. 11, 2000, now issued as U.S. Pat. No. 6,779,016 on Aug. 17, 2004, entitled "Extensible Computing System," naming Ashar Aziz, et al., as inventors, the entire disclosure of which is hereby incorporated by reference as if fully set forth herein. Aziz, et al., disclose a method and apparatus for selecting, from within a large, extensible computing framework, elements for configuring a particular computer system. Accordingly, upon demand, a virtual server farm or other data center may be created, configured and brought on-line to carry out useful work, all over a global computer network, virtually instantaneously.

Although the methods and systems disclosed in Aziz, et al., are powerful and flexible, users and administrators of the extensible computing framework, and the virtual server farms that are created using it, would benefit from improved methods for defining and deploying virtual server farms. For example, an improvement upon Aziz, et al., would be a way to specify, price, order and deploy virtual server farms using a networked computer workstation and a standard browser.

Using one known online service, "Rackspace.com," a user may select a server platform, configure it with a desired combination of disk storage, tape backup, and certain software options, and then purchase use of the configured server on a monthly basis. However, this service is useful only for configuring a single server computer. Further, the user interface is rudimentary and relies only on pull-down lists and other elements defined in Hypertext Markup Language (HTML).

Visual programming is a known method for rapidly defining a computer program by linking together graphical icons that represent program elements. For example, U.S. Pat. No. 5,163,130 (Jean-Marie Hullot, NeXT Computer, Inc., 1992) discloses a visual programming method in which computer program elements are selected from a palette and moved into a graphical representation of the logical flow of the program.

Microsoft Visio is a well-known tool for creating graphical presentations useful in business and industry. An end user may create a Visio presentation by dragging and dropping symbols into a workspace. Complex pictures and diagrams can be created. Templates or "stencils" may be created and distributed, enabling others to create new pictures and diagrams that have the same appearance parameters as the stencil that is used as a basis for the new diagrams.

Based on the foregoing, there is a clear need in this field for a way to visually create a logical description of a virtual server farm and instantiate a corresponding tangible, operable computing system relatively instantly, or other computer system configurations that are created based on the extensible computing framework described in Aziz, et al.

There is a specific need for a way to create such a description using graphic icons and other symbols that represent elements of a real server farm or other computer system.

End users also would find it useful to have a way to negotiate fees and costs for a particular virtual server farm with the service provider that is providing the hardware to implement the server farm. Thus there is also a need for a way to use the visual representation, or a resulting logical description of a computer system, to prepare a quote for fees and costs involved in creating, configuring and activating a real computer system that embodies the visual representation. There is a related need for a way to prepare such quotes on a rapid basis for use in connection with short-lived server farms and similar computer facilities.

There is also a need for a way to determine whether a particular institution, which is requested to implement the visual representation, has sufficient resources to create, configure and activate a real computer system that embodies the visual representation.

There is a further need for a way to integrate an editor for creating such a visual representation with other related functions pertaining to creating instant data centers, including customer account management, customer support, etc.

There is also a need for a way to cause instant creation of a physical server farm based on creating a graphical representation of the server farm. There is a need to provide such a tool in a way that is integrated with pre-existing graphic design tools that are compatible or based upon HTML or other personal computer software or systems.

SUMMARY OF THE INVENTION

The foregoing needs, and other needs that will become apparent from the following description, are achieved by the present invention, which comprises, in one aspect, a method of defining and deploying a networked computer system. A textual representation of a logical configuration of the networked computer system is created and stored, according to a structured markup language. Based on the textual representation, one or more commands are generated for one or more switch devices that are interconnected to one or more computing elements and storage devices. The commands instruct the switch devices to logically connect the computing elements and storage devices into an operable physical computer system that conforms to the logical configuration. As a result, a textual language may be used to specify one or more instant data centers or virtual server farms, and physical elements to implement the data centers or virtual server farms are then configured and activated as specified in the commands.

According to one embodiment, the method also includes receiving a graphical representation of a logical configuration of the networked computer system. The graphical representation is created and stored based on a first user selection from a palette of one or more graphical icons that represent logical elements and physical elements of the networked computer system and a second user selection of graphical interconnections of the icons. One feature of this aspect involves creating and storing a textual representation comprises the step of creating and storing the textual representation of the logical configuration of the networked computer system according to a structured markup language that is automatically generated based on the graphical representation.

In another feature, the textual representation comprises at least one server role definition comprising at least a role name value and a hardware type value, and one or more definitions of servers of the networked computer system, wherein each definition of a server uses and references the server role definition. Another feature is that the textual representation comprises at least one server role definition comprising at least a role name value and a hardware type value, and a plurality of definitions of servers in a server tier or server group of the networked computer system, wherein each definition of a server uses and references the server role definition.

According to another feature, the textual representation comprises at least one definition of a load balancing function; at least one server tier definition that defines a plurality of servers that receive inbound traffic from the load balancing function; and at least one fixed server definition that defines a fixed server that is associated with one of the servers in the server tier. A related feature is that the definition of the load balancing function comprises an indication that inbound traffic directed to the load balancing function arrives from an outer virtual local area network.

In another feature, the textual representation comprises at least one server tier definition that defines a plurality of servers that receive inbound traffic from a load balancing function; and at least one definition of the load balancing function, comprising an output port value, an input port value, a virtual address value, a load balancing policy value, and a tier value that identifies the server tier that is managed using the load balancing function. A related feature involves creating and storing at least one server tier definition that defines a plurality of servers that receive inbound traffic from the load balancing function. Each server tier definition comprises one or more input port values, a role value, and information specifying a maximum number of physical servers and a minimum number of physical servers for use in a server tier represented by the server tier definition.

In another feature, the textual representation comprises at least one fixed server definition that defines a statically addressed server of the networked computer system; and wherein each server definition comprises one or more input port values that identify a virtual local area network, a role value that identifies a processing role carried out by the server, and information specifying a network address of the server.

According to still another feature, the method also includes associating a first server definition of the textual representation with a graphical icon. The first server definition comprises at least one external entity declaration that represents a network address of a server that is represented by the first server definition. In the textual representation, a copied server definition is created and stored, based on duplicating the first server definition that is associated with the graphical icon. Each external entity declaration of the server definition of the textual representation and the copied server definition of the textual representation is resolved into a different actual network address. Based on the textual representation, one or more commands are generated for one or more switch devices that are interconnected to one or more computing elements and storage devices. The commands instruct the switch devices to logically connect the computing elements and storage devices into an operable computer system that conforms to the logical configuration.

In another feature, the textual representation comprises one or more firewall definitions that comprise a firewall name value, a plurality of port values that define logical connections to a firewall device associated with the firewall definition, and one or more definitions of services that the firewall is allowed to permit or deny.

In still another feature, the textual representation comprises at least one server role definition comprising at least a role name value and a hardware type value; a disk attribute definition that defines additional local disk storage for the server defined in the server role definition, comprising a drive name value and a drive size value; and one or more definitions of servers of the networked computer system. Each definition of a server uses and references the server role definition. A related feature involves generating one or more commands that allocate disk space according to the drive size value in a storage device that is accessible using a storage area network interface. The allocated disk space is mapped to a server of the networked computer system that implements one of the definitions of servers. The allocated disk space may be presented as a single logical volume, or as one or more logical disks that are created from logical volumes that are located on one or more physical disk drives.

In still another feature, the textual representation comprises an action definition that defines actions for execution for each server in a tier of one or more servers when an additional server is added to the tier. The action definition may comprise a tier name value that identifies the tier, and a script name value that identifies a script of actions for execution with respect to each server in the tier identified by the name value. The method also may involve receiving information indicating that a new server has been added to the tier; executing the script of actions with respect to each server in the tier.

In yet another feature, the textual representation comprises an action definition that defines actions for execution for each server in a tier of one or more servers when one of the servers is removed from the tier. The action definition may comprise a tier name value that identifies the tier, and a script name value that identifies a script of actions for execution with respect to each server in the tier identified by the name value. Action definitions generally comprise definitions corresponding to those actions that would be carried out in adding a server to a server farm manually. A related feature may involve receiving information indicating that one of the servers has been deleted from the tier and executing the script of actions with respect to each server in the tier.

In another aspect, the invention provides a method of defining and deploying a networked computer system that features a graphical user interface. In the GUI, a palette of one or more graphical icons that represent logical elements of the networked computer system is displayed. One or more of the graphical icons are selected. The selected icons are graphically interconnected. A graphical representation of a logical configuration of the networked computer system is created and stored based on the selection and interconnection. A textual representation of a logical configuration of the networked computer system is created and stored according to a structured markup language. Based on the textual representation, one or more commands are generated for one or more switch devices that are interconnected to one or more computing elements and storage devices. The commands instruct the switch devices to logically connect the computing elements and storage devices into an operable computer system that conforms to the logical configuration.

According to another feature, a user may select graphical icons representing power control features and add them to existing icons or other elements of the graphical representation.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram illustrating a top-level view of a process of defining a networked computer system;

FIG. 1B is a block diagram illustrating another view of a process of defining a networked computer system;

FIG. 1C is a flow diagram of a process of deploying a data center based on a textual representation;

FIG. 1D is a block diagram showing a client and a service provider;

FIG. 4B is a diagram of a firewall configuration dialog that may be used to create or modify one or more parameter values pertaining to a firewall;

FIG. 8 is a two-part block diagram that illustrates processes of generating FEML text and FML text based on a JavaScript object model, and the converse process of generating a JavaScript object model based on FML text.

DETAILED DESCRIPTION OF THE PREFERRED EMBODIMENT

Figure 1E:
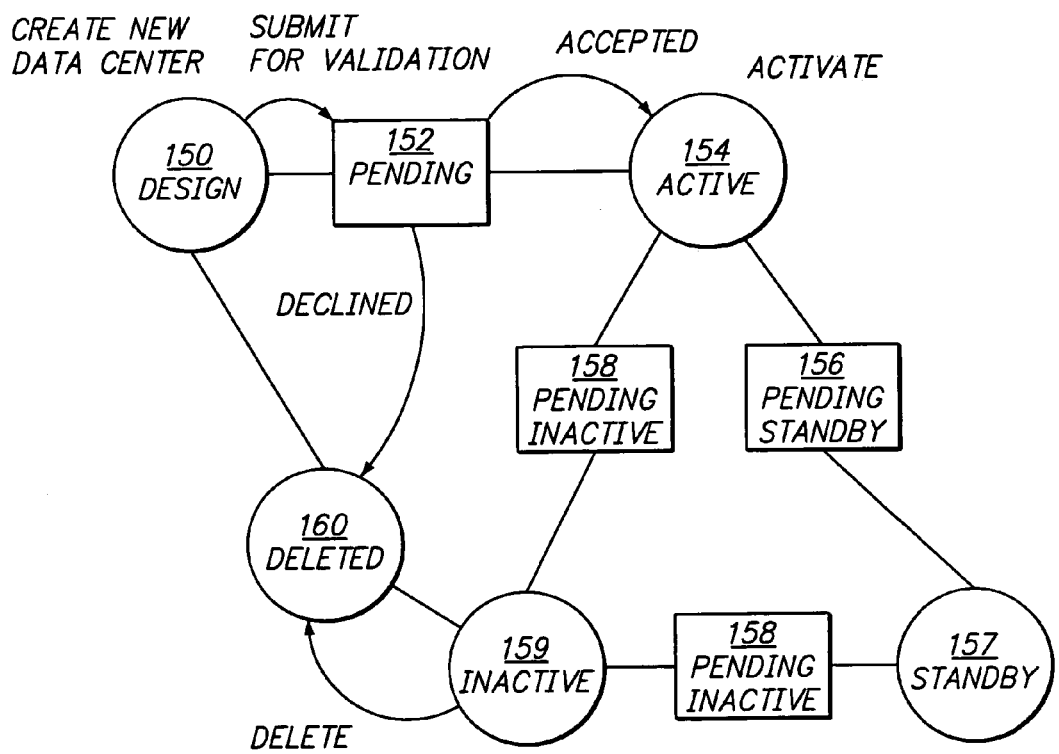
FIG. 1E is a diagram of states through which an instant data center may pass as it is designed and deployed.

A method and apparatus for defining a networked computer system using a textual representation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In this document, the terms "virtual server farm," "VSF," "farm," "instant data center," and "IDC" are used interchangeably to refer to a networked computer system that comprises the combination of more than one processor, one or more storage devices, and one or more protective elements or management elements such as a firewall or load balancer. Such a system is created on demand from a large grid of generic computing elements and storage elements of the type described in Aziz, et al. These terms exclude a single workstation, personal computer, or similar computer system consisting of a single box, one or more processors, storage device, and peripherals.

The description of embodiments herein follows the following outline:
1.0 OVERVIEW OF CREATING INSTANT DATA CENTERS
2.0 OVERVIEW OF CUSTOMER CONTROL CENTER
  2.1 FUNCTIONAL OVERVIEW
    2.1.2 CUSTOMER HOME PAGE
    2.1.3 FARM CHOOSER
    2.1.4 NEWS AND FARM DETAILS WINDOW
    2.1.5 NAVIGATION BAR
    2.1.6 FARM DETAILS WINDOW
  2.2 STRUCTURAL OVERVIEW 3.0 GRAPHICAL EDITOR
   3.1 FUNCTIONAL OVERVIEW
   3.2 EXAMPLE USER INTERFACE IMPLEMENTATION
      3.2.1 OVERVIEW
      3.2.2 FILE MENU
      3.2.3 CHANGE STATE
      3.2.4 UNDO AND REDO OPTIONS
      3.2.5 NODE ELEMENTS PALETTE
4.0 CREATING A SERVER FARM USING A GRAPHICAL EDITOR WITHIN THE CUSTOMER CONTROL CENTER
   4.1 WORKING WITH NODES
   4.2 WIRING
   4.3 VALIDATION
   4.4 CONFIGURATION OF NODES
   4.5 SERVER IMAGES
      4.5.1 CREATING SERVER IMAGES
      4.5.2 SERVER IMAGE MANAGEMENT
      4.5.3 LOAD BALANCER AND FIREWALL SNAPSHOT
5.0 ADMINISTRATIVE AND SUPPORT FUNCTIONS
   5.1 MONITORING
   5.2 REPORTING
   5.3 BACK-UP AND RESTORE MANAGEMENT
   5.4 SERVICE AND ACCOUNT ADMINISTRATION
   5.5 CUSTOMER SUPPORT FUNCTION
      5.5.1 TICKETS
      5.5.2 BACKUP/RESTORE
6.0 OBJECT MODEL
7.0 TEXTUAL REPRESENTATION OF INSTANT DATA CENTERS
8.0 HARDWARE OVERVIEW 1.0 Overview of Creating Instant Data Centers FIG. 1A is a block diagram illustrating an overview of a method of defining a networked computer system.

A graphical representation of a logical configuration of a computer system is created and stored, as shown in block 101. In one embodiment, block 101 involves using a software editor application to drag icons representing elements or nodes of a computer system and dropping the icons into a workspace, connecting the icons with lines representing network connections or wiring, configuring one or more parameter values associated with the nodes, and submitting the completed logical representation to a service provider for review and validation.

A textual representation of the logical configuration of the computer system is created and stored, as shown in block 102. The textual representation may be generated automatically based on the graphical representation, and the form of the textual representation may conform to a structured markup language, as described further herein. In block 104, one or more commands are generated, based on the textual representation, for one or more switch device(s). When the switch devices execute the commands, the networked computer system is created and activated by logically interconnecting computing elements. In the preferred embodiment, the computing elements form a computing grid as disclosed in the applications of Aziz and Aziz, et al., that are referenced herein.

FIG. 1B is a block diagram illustrating a more detailed view of the process of FIG. 1A. Generally, a method of creating a representation of a data center involves a Design phase, an Implementation phase, a Customization phase, and a Deployment phase, as shown by blocks 110, 112, 114, 116, respectively.

In the Design phase, a logical description of a data center is created and stored. Preferably, the logical description is created and stored using a software element that generates a graphical user interface that can be displayed by, and receive input from, a standard browser computer program. In this context, "browser" means a computer program that can display pages that conform to Hypertext Markup Language (HTML) or the equivalent, and that supports JavaScript and Dynamic HTML, e.g., Microsoft Internet Explorer, etc. To create a data center configuration, a user executes the graphical user interface tool. The user selects one or more icons representing data center elements (such as servers, firewalls, load balancers, etc.) from a palette of available elements. The end user drags one or more icons from the palette into a workspace, and interconnects the icons into a desired logical configuration for the data center.

In the Implementation phase of block 112, the user may request and receive cost information from a service provider who will implement the data center. The cost information may include, e.g., a setup charge, monthly maintenance fee, etc. The user may manipulate the icons into other configurations in response to analysis of the cost information. In this way, the user can test out various configurations to find one that provides adequate computing power at an acceptable cost.

In Customization phase of block 114, after a data center is created, a configuration program is used to add content information, such as Web pages or database information, to one or more servers in the data center that was created using the graphical user interface tool. In the Customization phase, the user may save, copy, replicate, and otherwise edit and manipulate a data center design. Further, the user may apply one or more software images to servers in the data center. The selection of a software image and its application to a server may be carried out in accordance with a role that is associated with the servers. For example, if a first server has the role Web Server, then it is given a software image of an HTTP server program, a CGI script processor, Web pages, etc. If the server has the role Database Server, then it is given a software image that includes a database server program and basic data. Thus, the user has complete control over each computer that forms an element of a data center. The user is not limited to use of a pre-determined site or computer.

In the Deployment phase of block 116, the data center that has been created by the user is instantiated in a computing grid, activated, and initiates processing according to the server roles.

FIG. 1C is a flow diagram of a process of deploying a data center based on a textual representation.

In block 140, the process retrieves information identifying one or more devices, from a physical inventory table. The physical inventory table is a database table of devices, connectivity, wiring information, and status, and may be stored in, for example, control plane database 135. In block 142, the process selects all records in the table that identify a particular device type that is idle. Selection of such records may be done, for example, in an SQL database server using a star query statement of the type available in the SQL language.

Database 131 also includes a virtual local area network (VLAN) table that stores up to 4096 entries. Each entry represents a VLAN. The limit of 4096 entries reflects the limits of Layer 2 information. In block 144, the process selects one or more VLANs for use in the data center, and maps the selected VLANs to labels. For example, VLAN value "11" is mapped to the label Outer_VLAN, and VLAN value "12" is mapped to the label Inner_VLAN.

In block 146, the process sends one or more messages to a hardware abstraction layer that forms part of computing grid 132. Details of the hardware abstraction layer are set forth in Aziz, et al. The messages instruct the hardware abstraction layer how to place CPUs of the computing grid 132 in particular VLANs. For example, a message might comprise the information, "Device ID=5," "Port=1/6," which means to place port "1" of device "5" on VLAN "6". The particular method of implementing block 146 is not critical. What is important is that the process sends information to computing grid 132 that is sufficient to enable the computing grid to select and logically interconnect one or more computing elements and associated storage devices to form a data center that corresponds to a particular textual representation of the data center.

FIG. 1D is a block diagram showing a client and a service provider in a configuration that may be used to implement an embodiment. Client 120 executes a browser 122, which may be any browser software that supports JavaScript and Dynamic HTML, e.g., Internet Explorer. Client 120 communicates with service provider 126 through a network 124, which may be a local area network, wide area network, one or more internetworks, etc.

Service provider 126 is associated with a computing grid 132 that has a large plurality of processor elements and storage elements, as described in Aziz, et al. With appropriate instructions, service provider 126 can create and deploy one or more data centers 134 using elements of the computing grid 132. Service provider also offers a graphical user interface editor server 128, and an administration/management server 130, which interact with browser 122 to provide data center definition, management, re-configuration, etc. The administration/management server 130 may comprise one or more autonomous processes that each manage one or more data centers. Such processes are referred to herein as Farm Managers. Client 120 may be associated with an individual or business entity that is a customer of service provider 126.

As described in detail in Aziz, et al., a data center may be defined in terms of a number of basic building blocks. By selecting one or more of the basic building blocks and specifying interconnections among the building blocks, a data center of any desired logical structure may be defined. The resulting logical structure may be saved as a named server image, and treated as a blueprint ("DNA") for creating any number of other IDCs that have the same logical structure. Thus, creating a DNA for a data center facilitates the automation of many manual tasks involved in constructing server farms using prior technologies.

As defined herein, a data center DNA may specify roles of servers in a data center, and the relationship of the various servers in the roles. A role may be defined once and then re-used within a data center definition. For example, a Web Server role may be defined in terms of the hardware, operating system, and associated applications of the server, e.g., dual Pentium of a specified minimum clock rate and memory size, NT version 4.0, Internet Information Server version 3.0 with specified plug-in components. This Web Server role then can be cloned many times to create an entire Web server tier or server group. The role definition also specifies whether a role is for a machine that is statically assigned, or dynamically added and removed from a data center.

One basic building block of a data center is a load balancing function. The load-balancing function may appear at more than one logical position in a data center. In one embodiment, the load-balancing function is implemented using the hardware load-balancing function of the L2-7 switching fabric, as found in ServerIron switches that are commercially available from Foundry Networks, Inc., San Jose, Calif. A single hardware load-balancing device, such as the Server Iron product that is commercially available from Foundry, can provide multiple logical load balancing functions. Accordingly, a specification of a logical load-balancing function generally comprises a virtual Internet Protocol (VIP) address value, and a load-balancing policy value (e.g., "least connections" or "round robin"). A single device, such as Foundry ServerIron, can support multiple VIPs and different policies associated with each VIP. Therefore, a single Foundry Server Iron device can be used in multiple logical load balancing positions in a given IDC.

One example use of a load-balancing function is to specify that a Web server tier is load balanced using a particular load-balancing function. For example, a computer system may be structured in a two-tier architecture, having a Web server tier ("server group") with a database server tier, with load balancing of this type. Another example use of a load-balancing function is to specify a load-balancing function for a tier of application servers, which are logically situated behind the load-balanced Web server tier, in a 3-tier configuration. This permits clustering of the application server tier to occur using hardware load balancing, instead of application specific load balancing mechanisms. This approach may be combined with application-specific clustering mechanisms. Other building blocks include firewalls, servers, storage, etc.

FIG. 1E is a diagram of states through which an instant data center may pass as it is designed and deployed. Transitions between states normally occur as a result of administrative action by an entity that hosts the instant data centers, e.g., Service Provider 126; however, an end user may also initiate one or more state transitions.

In block 150, a new instant data center is created. Block 150 may involve either editing information representing a new IDC or one that was created previously but which has not yet been submitted for approval by the Service Provider. Thereafter, the user or customer submits the instant data center design to Service Provider 126 for review and validation, and the IDC enters Pending state 152. An IDC in the Pending state 152 is awaiting approval from Service Provider 126 regarding one or more issues. If the IDC is approved and accepted, it is activated and enters Active state 154. In the Active state 154, the IDC is running.

If the IDC is subsequently de-activated, it enters the Inactive state 159 via the Pending Inactive state 158. In the Inactive state 159, an IDC is inactive and information about all its hardware resources is returned to an idle pool of Service Provider 126 for re-assignment or allocation to other IDCs. Generally, an IDC enters the Inactive state as a precursor to deleting the IDC. In the Pending Standby state 156, an IDC is about to enter the Standby state 157. In the Standby state 157, all devices of an IDC, excluding storage, are returned to the idle pool. It is possible to request reactivation of the farm and return it to a state similar to that prior to being put on standby. Generally, an IDC enters the Pending Standby state and the Standby state when it is not needed for active processing, but it is likely to be reactivated in a short time.

If an IDC is deleted permanently, it enters the Deleted state 160. In this state, information defining the IDC is deleted and the user no longer has access to it. An IDC may transition from the Design state 150 to the Deleted state 160 in response to a user selecting a delete function.

2.0 Overview of Customer Control Center

2.1 Functional Overview

In a preferred embodiment, a graphical user interface tool ("editor") is provided for use in defining one or more instant data centers. In one embodiment, the editor enables a user to define a data center by selecting icons representing computing elements, firewalls, load balancers, etc., and connecting them in a desired logical structure. The editor preferably forms a part of a customer control center application that provides numerous additional administration and management functions for defining and interacting with IDCs.

For example, an embodiment of a customer control center may provide creation of customer accounts; presentation of a customer home page with information specific to a particular customer; design and creation of instant data centers; monitoring of IDCs that are deployed and executing tasks; reports on the status and performance of IDCs; management of back-up and restore operations for IDCs; service and account administration; and customer support. Using these functions, the customer control center enables a user to visually design one or more IDCs, and specify associated service parameters, such as backup policy. In conjunction with a sales process, the customer can request the validation of an IDC design for implementation. The user may activate approved, validated IDC designs; this results in creating an operational computing center that is remotely accessible, ready for customization and test prior to full-scale deployment. Additionally, there may be remote access to servers for customization (e.g., addition of content or applications), monitoring and management of operations, scaling through cloning and addition of servers, network and storage capability, and customer care functions through a service desk facility.

In one embodiment, the customer control center is implemented in the form of one or more client-side software elements, such as browser applets or scripts, and server-side software elements, such as CGI scripts, Perl scripts, Java applications, etc. These software elements cooperate over a network that connects a client executing a browser to a server that executes the server-side software elements, and thereby carry out the functions described herein.

The term "click" herein is used to mean selection by a user, as by pressing a button of a pointing device such as a mouse that is audibly perceived as a click. However, embodiments are not limited to use with a mouse as a pointing or selection device, and any user input device for pointing or selecting may be used. Such devices include, but are not limited to, keyboards, trackballs, speech recognition interfaces, etc.

2.1.2 Customer Home Page

A customer home page is the starting location for each customer upon login. It serves as a portal to the rest of the customer control center. Thus, users may select an IDC to work on or begin work on a new IDC. Further, it serves as a place at which news, events or activities are highlighted. Presentation of a customer home page may include presentation of news articles; system-wide network status information; system wide alert information; system-wide maintenance schedule information; CERT advisories, system-wide environmental data; providing an online bulletin board for notification and availability of software updates; providing top level IDC status information; and providing marketing updates, e.g., availability of new services and competition updates.

In one embodiment, a news window is provided. Different categories of news articles are read from a server and displayed in the news window. When the user clicks on the title of a news article, the page reloads and the contents of that news story are displayed in a News and Farm Details window, which is described further below.

2.1.3 Farm Chooser

Each customer who uses the customer control center is associated with a unique customer account. A customer account may comprise one or more server farms. A customer may have one or more end users who use the customer control center. The farms available to an account are displayed in a farm chooser window, which may be structured as a tabular display. Long farm names are truncated and an ellipsis is displayed to indicate that the name continues. If there are too many farms to display, then a vertical scrollbar appears. A farm is highlighted in gray when a user hovers over the farm name with a cursor-pointing device. The farm chooser display may include an indication of the current state of the farm (e.g., Active, Standby, Pending Standby, Pending Inactive, Design, Pending, Inactive, etc.).

Once a user selects a farm by clicking on the farm's name, the page reloads into the user's browser. A graphical representation of the farm is displayed in a workspace or MapView area, which is described further herein. The farm that is displayed is highlighted in the Farm Chooser. The News and Farm Details window displays the details of the selected farm. A Lifecycle icon in the MapView area, described further herein in connection with FIG. 5, changes visual appearance based on the then-current state of the selected farm, which causes one or more actions to become available for the displayed farm. The available actions are consistent with the farm state. When no farm is selected, the only available action is "New," referring to creating a new farm.

2.1.4 News and Farm Details Window

In one embodiment, a News and Farm Details Window has two modes: "News Details" mode and "Farm Details" mode. It displays detailed information about the window that the user last interacted with. For example, if the user clicked on a news article last, then the News and Farm Details Windows displays the full text of the article, or other details. The news article is displayed in the form of an HTML file. If the user clicked on the Farm Chooser last, then the News and Farm Details Windows displays the farm configuration details. There are several fields that are displayed to the user to give information about the farm to the user. In one embodiment, such detailed information includes Name, Farm State, Farm Status, Activation Date, Data Center, Last Backup, and Backup Schedule.

In one specific embodiment, the Name value is the name of the farm. The State value indicates the current state of the farm as described above with respect to FIG. 1E. The Status value is a way to give state-sensitive feedback to the user for the current farm. The Activation Date value indicates the date on which the farm will or did become active. If the date has not been set then it displays "Not Set" or the equivalent. The Data Center value identifies a physical data center where the selected farm will run when active. The Last Backup value displays the date and time of the last backup that completed for this farm. The Backup Schedule value is a link that allows the user to view a schedule of future backup operations for the current farm.

2.1.5 Navigation Bar

Figure 3A:
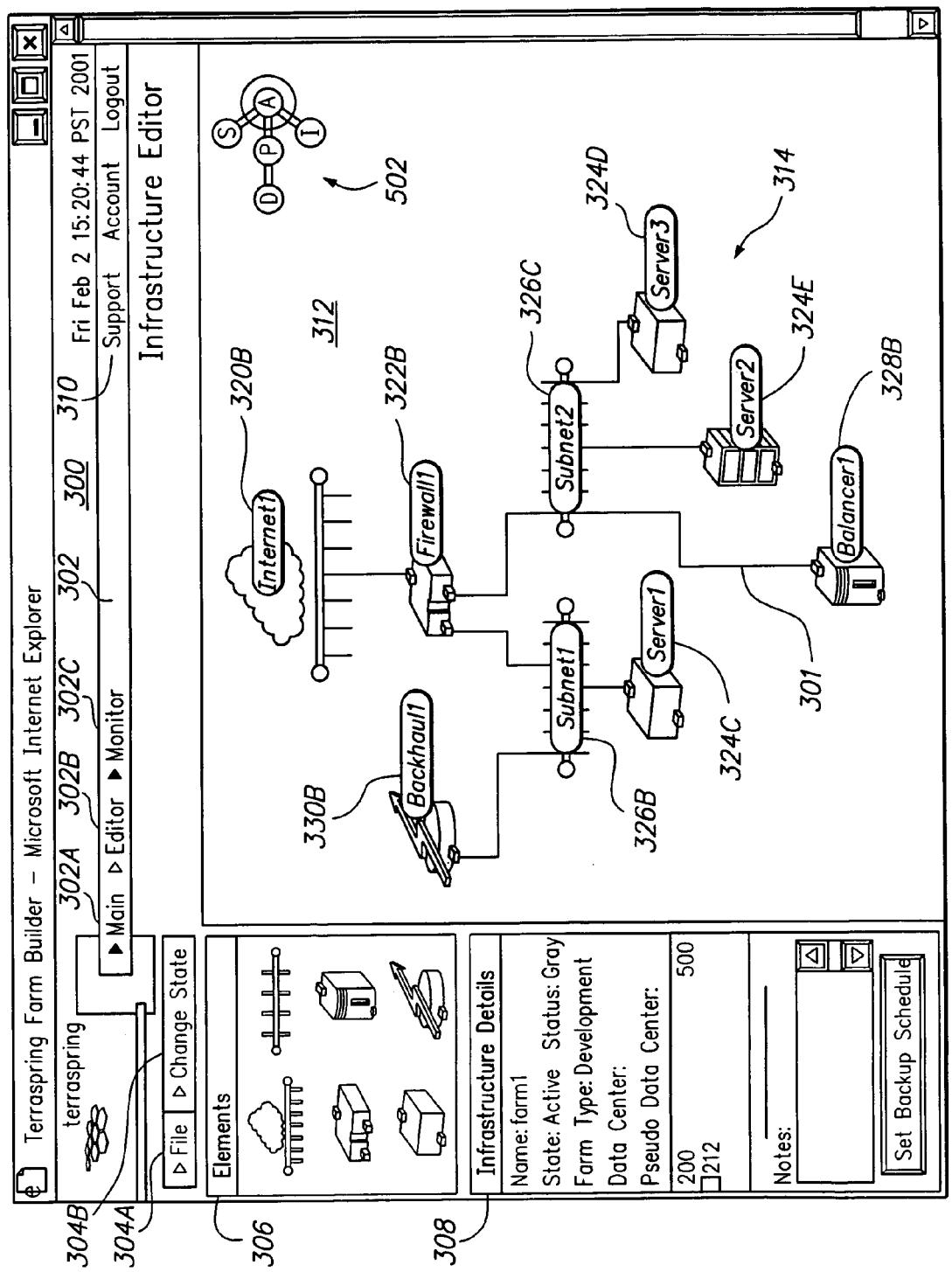
FIG. 3A is a diagram of a screen display that may be generated by a customer control center of the type described herein, when the customer control center is in an Editor mode.

FIG. 3A is a diagram of an example screen display that may be used to implement a customer control center. In one embodiment, a navigation bar ("Navbar") in the graphical user interface of the CCC display provides quick access for the user to switch between different farms in the same account and between the different modes. In this context, modes include a view-only (or 'Main') mode, an 'Editor' mode and a 'Monitor' mode. The current action being performed, or the current mode, may be indicated by a right-facing white triangle next to one of the modes on the Navbar as well as by the title displayed on the bottom right corner of the Navbar. For example, in FIG. 3A, Navbar 302 has a white triangle adjacent to an Editor link 302B.

In one specific embodiment, clicking on one of the different 'mode' options on the Navbar takes the user to that mode with respect to the current farm. The same operation is also achieved by hovering over the Navbar mode indicator with a pointing device, and then selecting the first option that is displayed in the resulting pop-up menu.

Other farms that can be viewed in that mode are listed immediately below the 'current farm' option. Clicking on one of these farms displays the requested farm in requested mode.

If a farm is requested in a mode for which it cannot be presented, then the page loads and displays but the farm and the farm details are not visible on that page. Following a link to a different page shows the same farm as before provided that the user doesn't pick a new farm while on that page.

In another specific embodiment, the NavBar includes an Account link, Support link, and Logout link. When the Account link is selected, a pop-up window appears that allows the user to view and edit account information. When the Support link is selected, a pop-up window gives the user access to help, trouble ticketing (including filing of 'Restore' tickets that request a data restore operation), and other support features. Selecting the Logout link logs the user out of the CCC. The user must login again to access any of the features of the CCC. The Navbar may also include a timestamp that displays the time in the user's local time zone.

2.1.6 Farm Details Window

In one embodiment, a Farm Details Window presents basic information about an IDC or farm. Some fields are editable by a user only when the CCC is in the design state. In one embodiment, when the CCC is in the design state, a user may edit a Name field, Data Center field, State field, Status field, SU Counter field, and Modification Status field. The Name value indicates a name of a farm. It is used in the DNS name of the nodes in the farm and therefore it conforms to the DNS naming conventions for the CCC, e.g., a letter followed by letters, numbers, and dashes. The Data Center field enables a user to select from a list of available data centers in which to deploy the server farm. The State field indicates the current state of the farm. The Status field indicates the current status of the farm.

The SU Counter field displays the current SU consumption rate of the farm, and changes according to user input that affects the price of the farm. The behavior of the SU counter is dependant on different circumstances. For example, if the user goes over their maximum, then a bar graph displays a red portion that indicates by how much they are over. If the user goes under their minimum SU value then the graph displays from 0 to the minimum and shows in green by how much they are under their minimum. If the farm is under design then the SU counter indicates the farm size and additionally, when it reaches the end of the bar then the counter drops down to the middle and starts counting up again. The Modification Status field indicates the modification status of the farm. Labels for these fields are displayed in red if the field is mis-configured, and are displayed in black if the field is configured properly.

2.2 Structural Overview

Figure 2A:
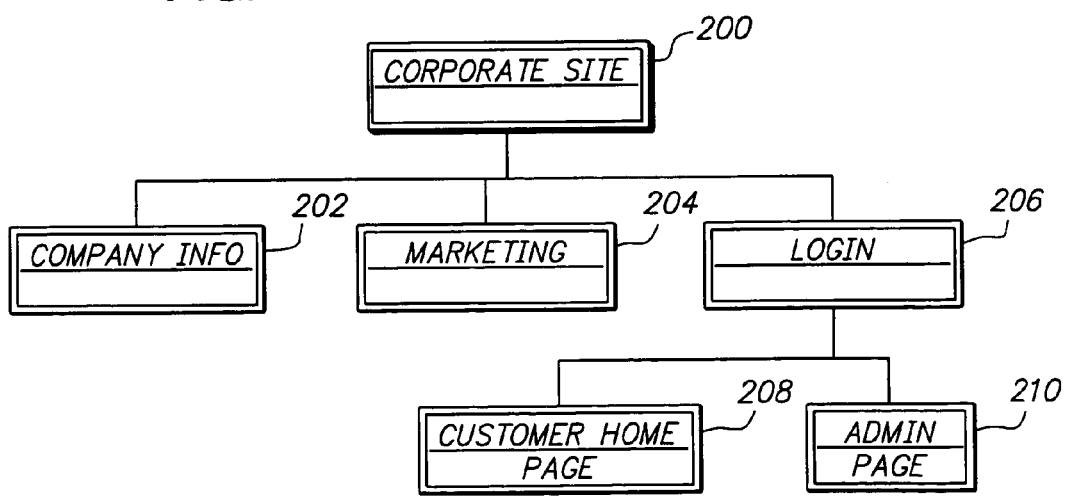
FIG. 2A is a block diagram that shows a page hierarchy that may be used to access an editor or customer control center.

FIG. 2A is a block diagram that shows a page hierarchy that may be used to access an editor or customer control center. Corporate site 200 represents a Web site or similar online information resource that is associated with a particular business enterprise, e.g., a corporation that is a customer of Service Provider 126. Within the corporate site 200, various information pages are provided, e.g., company information page 202, marketing page 204, etc. Alternative pages may be provided. Corporate site 200 also includes a login page 206 with which a user may access a customer home page 208 and an administration page 210. Thus, login page 206 provides a gateway to access IDC control functions. The pages shown in FIG. 2A may be implemented using one or more computer programs or other software elements that generate the pages shown in FIG. 2A.

Figure 2B:
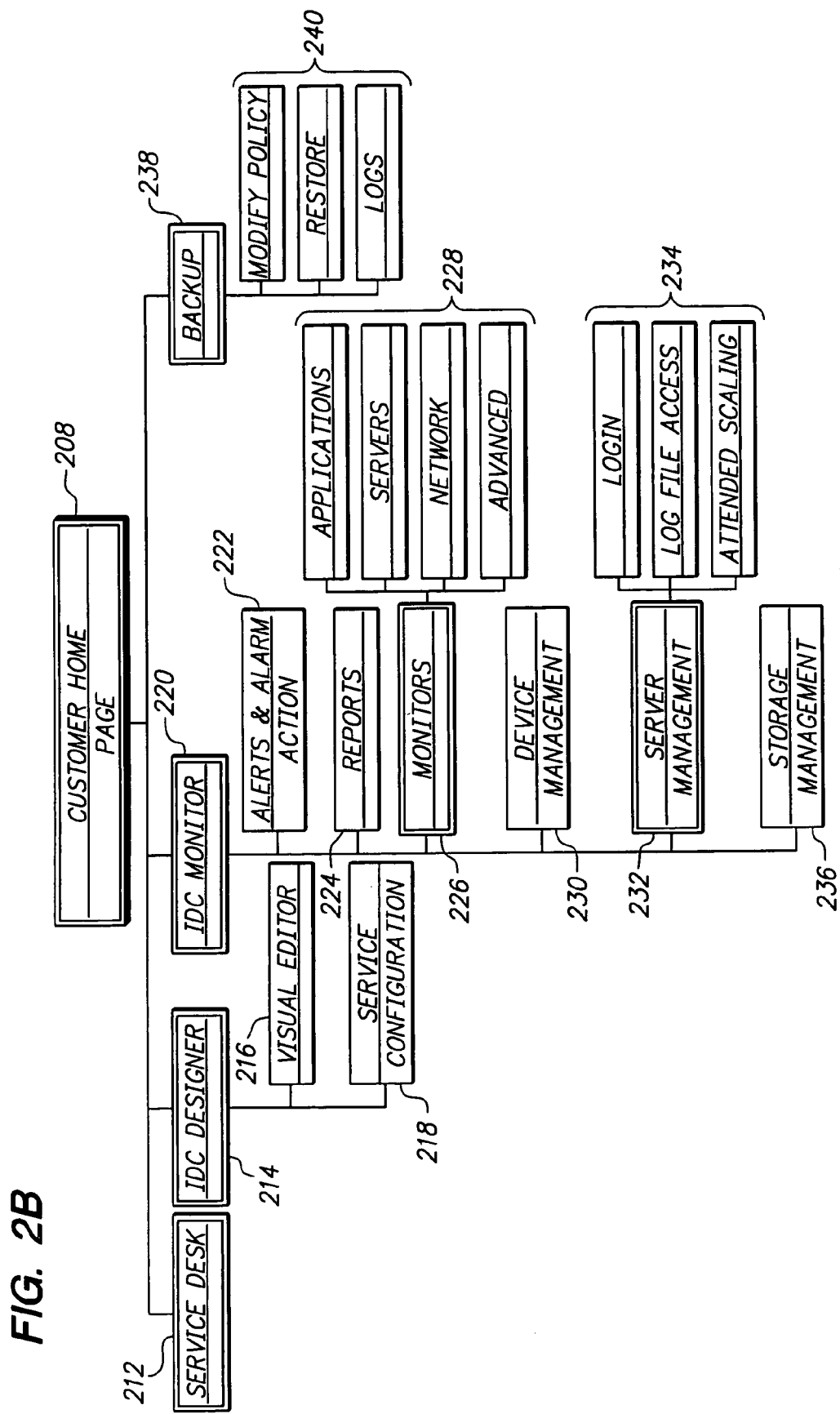
FIG. 2B is a block diagram of pages that may be generated as part of a customer home page of a customer control center.

FIG. 2B is a block diagram showing pages and related functions that may be accessed through customer home page 208.

Service Desk page 212 provides access to a front-office support application, such as that available from Clarify, whereby service cases may be created and managed. Service Desk page 212 may also provide access to applications or processes that carry out other customer interactions, such as requesting a restoration of data from a backup server to a server farm server.

IDC Designer page 214 is displayed when a user wishes to graphically create or modify a logical design of an IDC. The IDC Designer page 214 is linked to a Visual Editor 216 and Service Configuration 218.

Visual Editor 216 is used to create a design for an instant data center, modify a design of an IDC, save a design of an IDC, and validate a design of an IDC. For building an Instant Data Center, Visual Editor 216 enables the user to select a design from one of a plurality of templates, or create a new blank IDC. The user may select one or more IDC components from a palette, place the components in the IDC editor frame, and establish connections between two components. The user may move a connected component in an IDC; after the move operation is completed, the connections of the component to other components are re-rendered. The user may remove a component from an IDC or remove a connection between two components. The user may also receive help information useful in IDC construction.

The Service Configurator 218 allows the user to specify additional service parameters, e.g., requested date for an IDC to start operation; backup policy; and DNS configuration information.

IDC Monitor 220 provides alerts, alarms, reports, monitors, and management functions. IDC Monitor can access and use information stored in IDC Component database 129, Customer information database 131, FML Repository 131, and Control Plane Database 135.

Visually, IDC Monitor 220 presents a graphical view of an IDC similar to the IDC Designer 214. However, as what is being presented represents operational infrastructure, major editing features including the component palette are locked out. The user may only edit those components that are defined in the service contract. This may include being able to grow or shrink a tier of servers within bounds established by the contract. If the user has not elected to use scaling services, the IDC is static and may not be modified.

As indicated by block 222, IDC Monitor 220 provides Alerts and Alarm Actions. An alert contains instructions that tell the system how to respond if an error or warning condition is returned by a monitor. For example, if a Disk Space Monitor is used to monitor the disk space on a server, it will return an error status if the disk becomes too full. The user can create an alert that tells the system to page him/her or send e-mail if this ever happens.

Because the user can create multiple alerts, the system can take more than one action for a given situation. For example, the user can create one alert that tells the system to issue a page whenever any monitor returns an error status and another that tells the system to run a script that deletes files in the /tmp directory if a Disk Space Monitor returns an error. If a disk ever became too full, the system would page and would run the script to delete the files in /tmp.

As shown by block 224, IDC Monitor 220 includes a Reports function. The user can generate a management report for a single monitor, several monitors, or several monitor groups. Management reports are generated in table format and may include bar charts or line graphs. The management reports can be printed directly from the browser window. The user can also save report data to a text file suitable for importing into a spreadsheet application. Bar charts and line graphs can alternately be saved individually as graphics files.

IDC Monitor 220 also features a Monitors function 226 that allows detailed information to be collected from an IDC. Monitors function 226 may include applications monitors, server monitors, network monitors and advanced monitors, collectively identified in FIG. 2B by reference numeral 228. These monitors are described in more detail hereinafter. Additionally, alerts may be generated if the certain thresholds are exceeded (such as network response time or disk space utilization being outside acceptable bounds). Each new IDC is automatically constructed with a default set of monitors. Once operational, the user may tune and modify the monitoring as required.

Application monitors test network applications by simulating end user actions. For example, a Database Monitor connects to a database and performs a query to verify that data can be retrieved.

One or more Server Monitors may be provided. Server monitors measure server and operating system attributes. For example, a CPU Utilization Monitor reports the percentage of CPU currently in use to ensure that the user knows if the CPU is being overloaded. A Disk Space Monitor reports the percentage and amount of disk space currently in use so that the user can act before running out of disk space. A Memory Monitor measures virtual memory usage and notifies before the user has a problem. A Network Monitor measures the local area network's saturation based upon packet errors, throughput (bits/second), and open connections. A Service Monitor verifies that specified processes are running, such as Web server, Mail, FTP, News, Gopher, Telnet, and DNS. A Web Server Monitor reads the web server log and reports data on hits, bytes, errors, hits per minute, and bytes per minute.

Monitors 226 also may include network monitors that test network connectivity and performance. For example, a DNS Monitor checks a Domain Name Server via the network. It verifies that the DNS server is accepting requests, and also verifies that the address for a specific domain name can be found. A Ping Monitor verifies that specified hosts are available via the network to ensure continuous availability of critical connections. A Port Monitor determines whether a service on a port can be connected to. An SNMP Monitor reads a value from an SNMP device. Many network devices support the SNMP protocol as a way of monitoring the devices.

Monitors 226 may include one or more Advanced Monitors. For example, Composite Monitor checks the status of a set of monitors or monitor groups. A Directory Monitor checks the file count and directory size and indicates if any of these exceed specified criteria. A File Monitor checks the size, age, and, if the user wishes, the content of a file, and notifies if any of these change. An LDAP Monitor checks an LDAP server by sending a password authentication request and reports the result. A Link Check Monitor checks all of the internal and external links on a site to ensure that they can be reached. A Log File Monitor allows a user to generate warnings and errors based upon data in an application's log file. For example, many applications write error messages to a log file. This monitor can scan those log files, looking for error messages and generating alerts when it finds them.

A News Monitor connects to a news (NNTP) server and verifies that groups can be retrieved. An NT Performance Counter Monitor tracks the values of any Window NT performance statistic. An NT Dial-up Monitor verifies that a dial-up connection can be made to an ISP or Remote Access server and measures performance over the dial-up connection. An NT Event Log Monitor watches one of the Windows NT Event Logs (System, Application, or Security) and generates alerts when entries are added. A Script Monitor verifies that a script executes correctly. A URL Content Monitor retrieves a web page and compares and saves multiple matching values from the content. A URL List Monitor allows a user to monitor an entire list of URLs, rather than defining several separate URL monitors.

Device Management function 230 of IDC Monitor 220 allows access to configuration dialogues for each support device, such as load balancers, firewalls and servers.

Server Management function 232 of IDC Monitor 220 provides server management operations, such as login, log file access and attended scaling, referred to collectively in FIG. 2B by reference numeral 234. For example, Server Management function 232 enables interactive login to a server of an IDC using Secure Shell (ssh) or pcAnywhere); customization and addition of content to a server; and cloning of servers.

Storage Management function 236 of IDC Monitor 220 enables a user to request an increase or decrease in available storage for an IDC.

Backup function 238 enables a user to modify a backup policy for an element of an IDC, carry out a data restoration operation, and view various system logs. These functions are identified collectively in FIG. 2B by reference numeral 240. Backup function 238 accesses IDC Component database 129, Customer information database 131, FML Repository 131, and Control Plane Database 135.

Figure 2C:
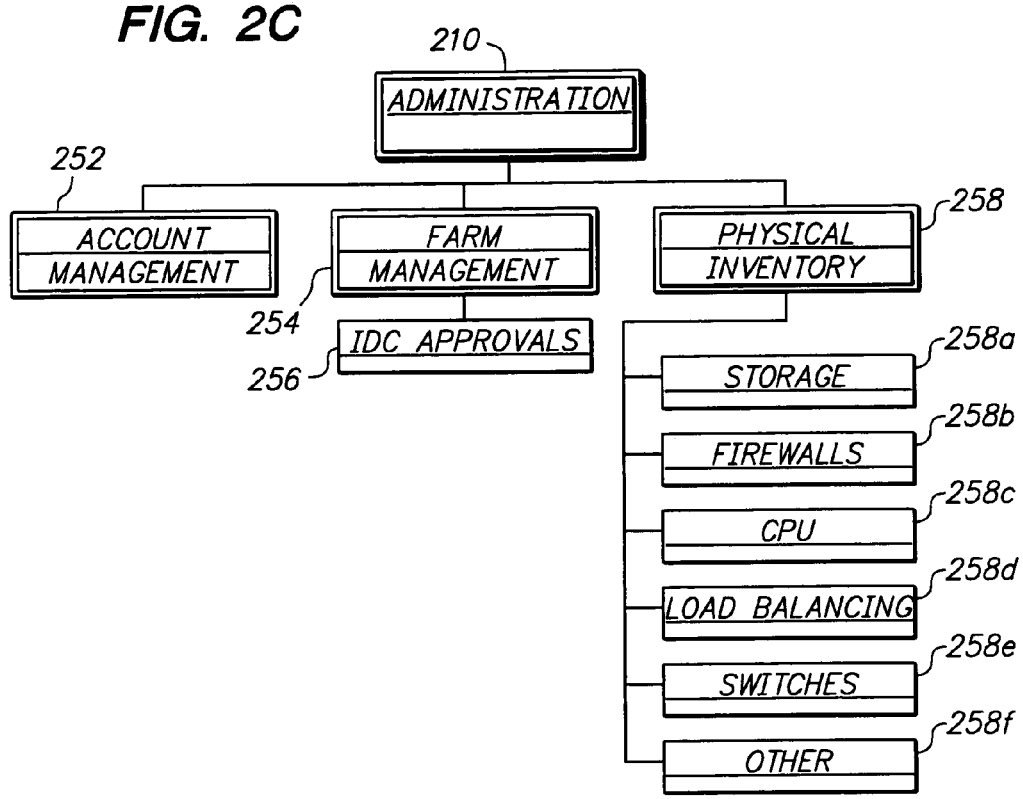
FIG. 2C is a block diagram of pages that may be generated as part of an administration page of a customer control center.

FIG. 2C is a block diagram showing pages and related functions that may be accessed through administration page 210. Available functions include Account Management function 252, Farm Management function 254, and Physical Inventory function 258. Physical Inventory 258 includes Storage 258a, Firewalls 258b, CPU 258c. Load Balancing 258d, Switches 258e and Other 258f.

Account Management function 252 accesses IDC Component database 129, Customer information database 131, FML Repository 131, and Control Plane Database 135. A user may create new login account, update account information, delete a login account, reset a password, etc. The system may also inherit this information from a customer relationship management application, e.g., Clarify.

Farm Management function 254 enables a user to view an IDC graphically and in a textual representation, facilitating validation of the IDC. In particular, the user may approve an IDC configuration, including specifying an actual date at which the IDC can be activated, decline an IDC configuration, including providing one or more reasons or other information for declining, and update IDC information, including an actual start date (i.e., the IDC may be activated by the customer from this date onwards) or an indication that the IDC is ready for activation.

Physical Inventory Management function 258 provides one or more back-end operations relating to server farm hardware, e.g., failure monitoring, fault diagnosis, processing maintenance requests, adding more elements, etc.

Figure 2D:
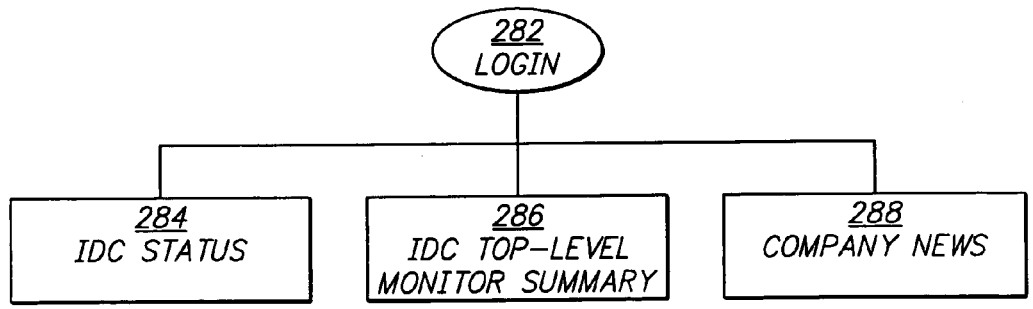
FIG. 2D is a block diagram of an example embodiment of a home page.

FIG. 2D is a diagram of an example embodiment of home page 208. A practical embodiment may have one or more of the illustrated components. Login component 282 may comprise a login screen that prompts a user to enter a username or other login identifier and a password or other authentication information.

IDC Status component 284 may display a list of IDC records that are currently under management by the editor. In an embodiment, a user type value is associated with each user of the editor, and the user type value associated with the current user determines what specific information is shown for each IDC record by the IDC Status component 284. For example, users who are Operational see all IDCs in all states (Active, Inactive, Design). Users who are Managers see only Active IDCs. For each IDC, the following information is displayed, e.g., in tabular format: IDC Name; Universal Resource Locator (URL) of the root server of the IDC; IP address of the IDC; a Validation flag value of "Y" or "N" that indicates whether the IDC has been validated as having a correct logical configuration; a Status value (Active, Inactive, Design); a State value (OK, Warning, Fault); and an Owner value that identifies the user who created or owns the IDC record.

IDC Top-level Monitor Summary component 286 presents a monitor summary view. For a particular IDC, the Top-level Monitor Summary view includes a Network value identifying the network that contains the IDC, a Server value that identifies the root server of the IDC, a URL value, and one or more Environmental values that provide environment information.

The Company News component 288 shows current news from a company or other institution that owns, uses or is associated with the editor.

Figure 2E:
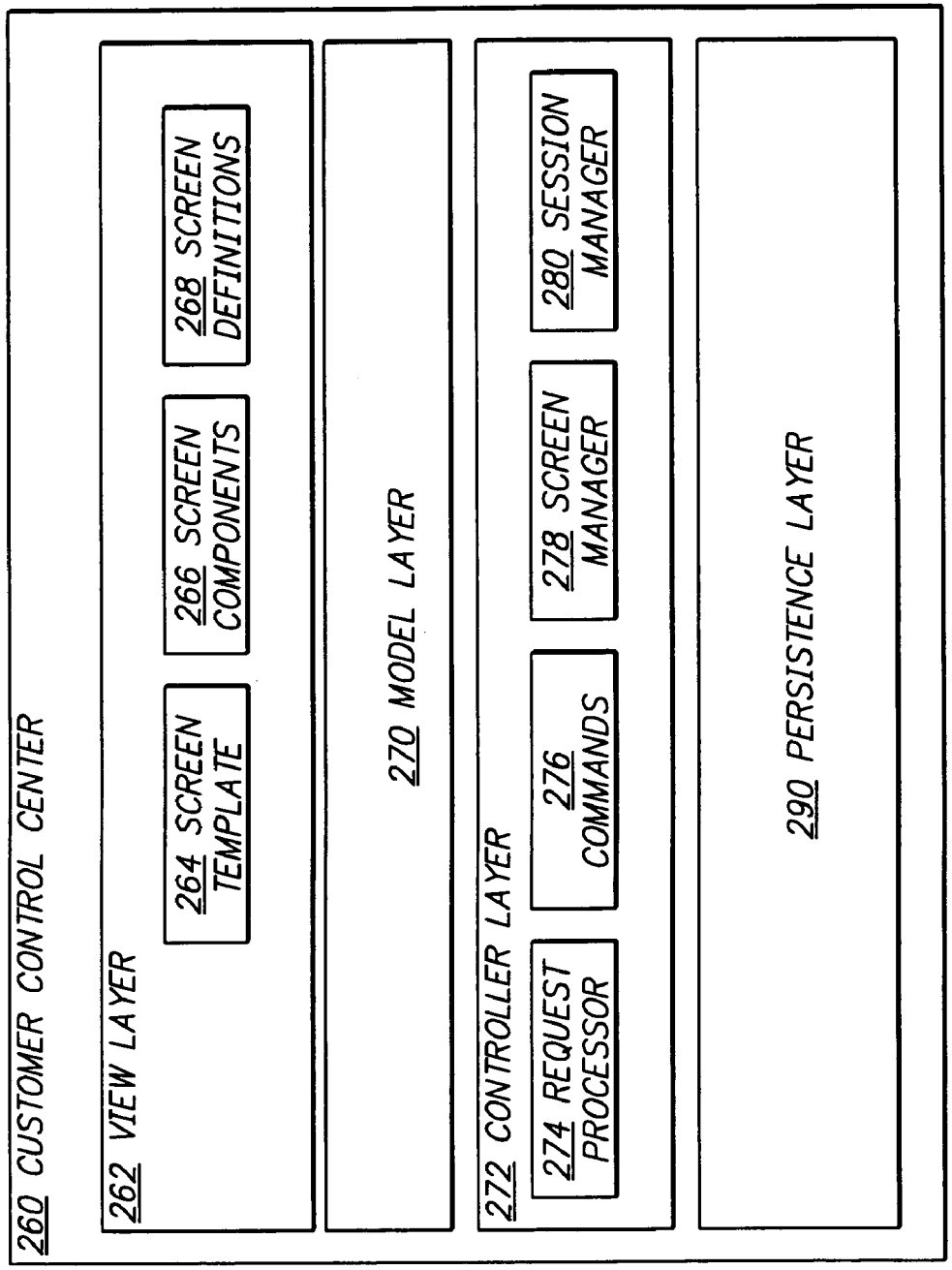
FIG. 2E is a block diagram of structural elements of a customer control center.

FIG. 2E is a block diagram of a software architecture that may be used to implement an embodiment of a Customer Control Center, which generally comprises four (4) major logical layers: View layer 262, Model layer 270, Controller layer 272, and Persistence layer 290.

View layer 262 is responsible for dynamically generating information to be displayed on a client, e.g., generating HTML or other Web content for display in a browser. In an embodiment, the view layer is implemented using a template mechanism that has three (3) major components. A Screen Template 264 comprises a page skeleton with several placeholders, in which each of them can display dynamic contents generated by the screen components. Each of the placeholders is referred to as a parameter of the template. With the screen template, different screens are generated by passing different parameters to the template. Screen Components 266 comprises a set of sharable components that can be inserted into the placeholders of the template. Usually each screen component is responsible for generating a particular of information. Screen Definitions 268 is a repository that stores the screen definitions for all screens. A screen definition is the set of template parameters that completely defines a screen.

Screen Template 264 may comprise a plurality of logical placeholders at specified screen positions, with associated parameter names. For example, Screen Template 264 may comprise placeholders named Title, Banner, MenuBar, Navigation, Body, etc. A different screen can be created by dynamically including different screen components for each placeholder, e.g., using JSP runtime includes commands. The set of template parameters that completely defines a screen is called a screen definition.

In one embodiment, the Title placeholder contains the title of the page; to be displayed on the title bar of the browser. The Banner placeholder contains the banner of the page; includes elements such as the company logo, login/logout button, help button, search box, etc. The MenuBar placeholder contains the menu bar for site navigation. The Navigation placeholder contains the tree menu for browsing the farms of an account. The Body placeholder contains the major contents of the page.

In one embodiment, Screen Components 266 are sharable components that can be inserted into Screen Template 264. One or more Java Server Pages may implement Screen Components 266. Each of the Screen Components 266 has a specified function (e.g., open the editor for editing a text representation of a server farm, display a form for entering information for a new user), and is associated with an access permission value for the roles Administrator, Operations, Manager and Guest.

Model Layer 270 consists of domain specific objects that determine the current state of the application. Model objects of the Customer Control Center include Farm, Account, User, etc. A typical domain object contains a set of get and set methods for retrieving or updating the current state of the object. An object model that may be used is described further herein in connection with FIG. 3A.

Controller Layer 272 is responsible for coordinating Model Layer 270 and View Layer 262. View Layer 262 depends on the Controller Layer 272 for screen selection. Model Layer 270 depends on the Controller Layer 272 for making state changes to the model. The Controller Layer 272 accepts user requests from the View Layer 262, creates appropriate command objects, and processes the requests by invoking the corresponding methods in the Model Layer 270.

In an embodiment, responsibilities of the controller layer are implemented in separate components. A Request Processor 274 provides a single point of entry and is the component to which all requests or URLs are delivered. It is responsible for initializing session objects and creating business command objects based on user requests (e.g., HTTP requests). For example, when Request Processor 274 receives an "add_account" request, containing parameter values for a customer identifier, first name, last name, company, street, city, state, zip, phone, fax, and email, Request Processor 274 creates an AddAccountCommand object, and instructs the Screen Manager 278 to display the "new_account_success" screen next. Thus, for each inbound request, Request Processor 274 can generate corresponding objects and values.

A Command component 276 handles user requests by invoking corresponding methods in Model Layer 270. A Screen Manager 278 determines which screen is to be displayed based on the current state of the application or the role of the current user. In particular, Screen Manager 278 can access Screen Definitions 268, and receives a "next screen" definition or instruction from Controller Layer 272. In response, Screen Manager 278 fills in Screen Template 264 with appropriate information, resulting in creating a final screen definition that is sent to the client browser.

A Session Manager 280 is responsible for maintaining references to the current set of accessible model objects to be used by the view layer. The Session Manager 280 is responsible for maintaining references to the current sets of accessible model objects to be used by the View Layer 262. Model objects are maintained using the HTTPSession object. The Session Manager 280 also updates references to the model objects whenever the user navigates to different objects. All model objects are removed after the current user logs out of the system. The following describes the list of model objects maintained by the session manager, the names that the screen components can use to reference them, the request and the parameters expected by the session manager to update (or initialize) the references to the objects.

| Model Object | Name | Requests (Actions) | Parameters |
|---|---|---|---|
| User | user | Initialized right after the user logs into the system | |
| Account | Account | Initialized right after the user logs into the system | |
| Farm | farm | edit_farm, view_farm_ops, view_farm_mgr | index (index to the farms array of the current Account object) |
| Server | server | TBD | index (index to the servers array of the current Farm object) |
| User[] | users | all_users admin, all_users_ops | |
| Account[] | accounts | all_accounts | |

For example, to access the current farm model object, a screen component can issue a URL that contains the jsp: useBean tag:

<jsp:useBean id="farm"
   type="com.terraspring.ccc.model.Farm"
   scope="session">

The screen can then retrieve the current farm's FEML property by using the jsp:getProperty tag:

<jsp:getProperty name="farm" property="fem1">

3.0 Graphical Editor

3.1 Functional Overview

Design and creation of Instant Data Centers generally involves providing a drag-and-drop graphical editor with which a user may draw server farm designs. In a preferred embodiment, the editor includes a palette that features icons representing standard server farm elements. For example, icons may represent hardware elements such as firewalls, load-balancers; application servers or database servers having various processor and RAM configurations, generic or general purpose servers having various processor and RAM configurations, and Internet or network connectivity (e.g., icons may represent the Internet, sub networks, backhaul connections, etc.).

Other functions of the editor may include defining tiers (i.e., a group of identical systems); automatic configuration and reconfiguration of load balancer(s) as an IDC scales in size; automatic configuration of firewalls; connecting or wiring-up discrete elements into a fully functional multi-tier network; copying or pasting server elements using server cloning; and deleting elements.

The editor may be implemented, for example, in the form of a software plug-in for Microsoft Visio such that a Visio drawing may be saved in FML format. Alternatively, the editor may be implemented as a standalone software application program that can accept Visio format drawings as input. Such an application may be implemented in the form of one or more client-side software elements, such as browser applets or scripts, and server-side software elements, such as CGI scripts, Perl scripts, Java applications, etc. These software elements cooperate over a network that connects a client executing a browser to a server that executes the server-side software elements, and thereby carry out the functions described herein. In the example of FIG. 3A, graphical editor functions are shown as integrated with a customer control center application; however, this structure is not required, and a graphical editor may be provided as a standalone application.

The editor may provide the ability to display a graphical representation of a virtual server farm in an alternative view format, e.g., a spreadsheet view having one row for each element in the virtual server farm. The view format also may be FML source text format, binary format, etc. Functions for converting from a view of one format to another may be provided.

The editor may also provide the ability to "submit" a design of a data center for review and approval by Service Provider 126, and the ability to save and organize designs in a folder-like structure, including naming different designs or IDCs. Another function may provide the ability to designate the status of designs, using various status values, e.g., IDC in design (under construction), IDC pending validation, Approved IDC—inactive, Active IDC, Archived IDC. Yet another function may provide an ability to activate approved designs, including manual activation by the customer, when needed; designating a start date and time for activation; and designating a duration of activation (e.g., by start and end date)

Server farm element configuration is provided so that once a logical server farm architecture is created and stored, a customer can configure each element of the server farm with appropriate software, e.g., software other than the operating system or other basic server software. The customer is given access to each element to configure the machines with desired software. The server farm element configuration function may have numerous sub-functions. For example, in one embodiment, a sub-function enables a user to remotely and secure login into any individual element within an IDC, using Secure Shell (SSH), a PCAnywhere client, etc.

Another function provides information on the status and location of tapes or other media that customers have sent to Service Provider 126 for loading on to their IDC(s). For example, a customer can send in tapes of other media, and Service Provider 126 loads the media in a device in an online staging location that is accessible and viewable by the customer. The Service Provider 126 notifies the customer when the media is accessible at that location, and provides the location. The customer then remotely loads a software image from the specified location to each machine that needs the image.

Still another function enables configuration of non-standard, customer configured server farm elements, for example, application servers, NFS servers, FTP servers, mail servers, etc. Yet another function may provide the ability to download software images via the Internet to any element of an IDC.

Using another sub-function, a user can view and modify detailed property values for any element within an IDC, e.g., element type/role, tier identification, element name, hardware configuration (CPU, Memory, Disk), software configuration (installed software images, versions for those images, designation of maintenance ownership of each image (e.g., Service Provider 126 or customer)). Another sub-function provides software patch and upgrade management, including the ability to upgrade IDC elements with the latest patches and upgrades for software images. This may include providing a menu of all patches for all software packages that are supported for various server and platform types, although such functionality is not required. A customer may request the installation of patches, and the system can provide notification to customers about the availability of new patches or upgrades and how they can be installed onto their IDCs.

3.2 Example User Interface Implementation 3.2.1 Overview

FIG. 3A is a diagram of a screen display that may be generated by a customer control center of the type described herein, when the customer control center is in an Editor mode.

A screen display 300 may be displayed, for example, in a window of a browser or similar computer program. Screen display 300 includes a navigation bar 302 having the functions described above. Navigation bar includes mode selection links 302A, 302B, 302C for accessing the Main, Editor, and Monitor modes of the system, respectively. One or more function links 304A, 304B are provided to select different basic functions of the customer control center, as discussed further below.

A palette 306 of graphical icons representing server farm elements is provided. Icons in the palette 306 may be dragged and dropped into a workspace 312 (or "MapView") to result in creating a graphical representation 314 of the logical and physical structure of an IDC or server farm. An Infrastructure Details panel 308 displays detailed information about elements in the IDC.

Screen display 300 also may include one or more function buttons 310 for accessing functions such as help information, account information, customer support, etc.

Selecting the Editor link 302B causes the customer control center to enter an Editor mode in which a palette 306, workspace 312, and Infrastructure Details panel 308 are displayed. The workspace 312 provides a graphical display of a farm 314 comprising nodes that are connected by wires 301, and is used to render and edit the appearance of the farm. Nodes of farm 314 in the workspace 312 may be dragged to a new location within the workspace. Any wires 301 connected to the node are updated when the drag is complete. Software elements that implement the workspace 312 and its functions also implement the functionality of connecting and disconnecting node wiring for the editor. Included in the node wiring feature is port highlighting; ports of nodes that have connections are highlighted.

Workspace 312 also includes a Node Status Display that uses colors to indicate the status of the nodes based on monitoring information. Workspace 312 may have Context Sensitive Node Menus for actions that can be performed on or relative to the node. For every node type, action, and farm state there is a unique menu that is generated. Menu entries that are followed by an ellipsis ( . . . ) signify that they launch a window when selected. Menu entries that end in an arrow signify that they bring up a submenu when clicked.

In one embodiment, the workspace 312 functions as indicated in the following

| Allowed Behavior Table: | | | | | |
|---|---|---|---|---|---|
| Farms | | Editor | Monitor | Report | Backup/Restore |
| Design | | M, D, W | N/A | N/A | N/A |
| Pending | | M, D | N/A | N/A | N/A |
| | M, S | M, D, W | M, S | M | M |
| Standby | | M, D | N/A | M | N/A |
| Inactive | | M, D | N/A | M | N/A |

Figure 5:
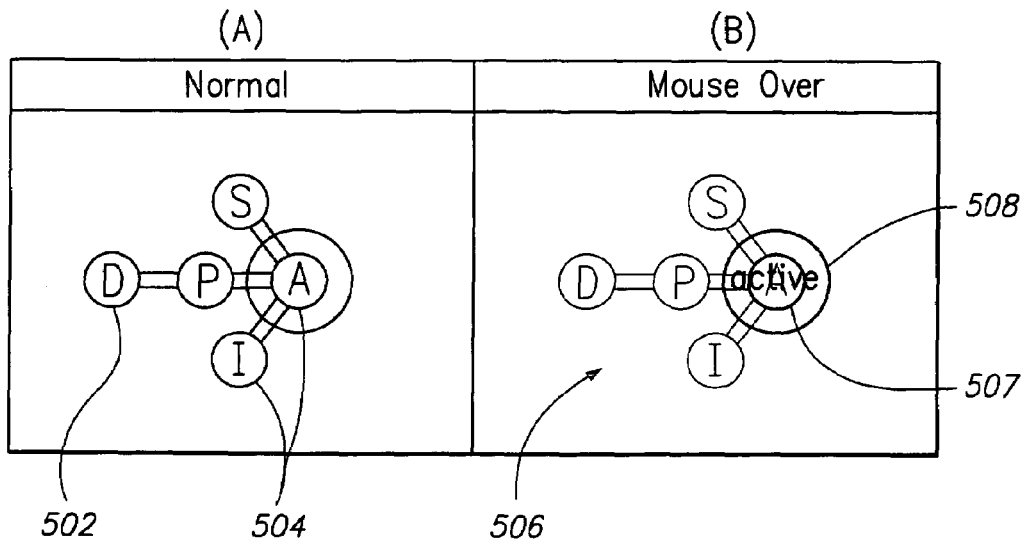
FIG. 5 is a two-part diagram of a Lifecycle Icon according to one embodiment.

D = dragging of node icons
M = context sensitive menus
S = status information
W = wiring of nodes
N/A = Not applicable FIG. 3A includes a Lifecycle icon 502 in screen display 300. FIG. 5 is a two-part diagram of a Lifecycle Icon according to one embodiment. The Lifecycle Icon provides visual feedback to the user about the current state of the farm. The state that is displayed by the Lifecycle icon matches the actual state of the farm, and corresponds to one of the states shown in FIG. 1E. FIG. 5(A) shows Lifecycle Icon 502 in normal form wherein it comprises a plurality of interlinked symbols 504 that represent possible farm states. When a user places a cursor over the icon, its appearance changes to display the name of the current state. For example, FIG. 5(B) shows Lifecycle Icon 506 for a farm that is in the active state, in which an active state symbol 507 is highlighted and labeled with the state name 508 ("active").

3.2.2 File Menu

Referring again to FIG. 3A, a File menu of display 300 is accessed by selecting File link 304A. Using the File menu, a user may retrieve an electronic file that contains information defining a computer system, save information about a computer system that may be shown in workspace 312 to a new file, convert information defining a computer system from one format to another, etc. In one specific embodiment, the File menu has functions named Open, New, Save, Save As, Remove, Undo, Redo, and Debug.

The Open function opens a farm into the editor. A dialog box allows the user to choose a farm by name or cancel. The New function enables the user to start designing a new farm. The Save function saves all changes to the current farm. The Save As function saves the design of the current farm and any changes made since the last save under a different name. The new farm is in the design state and will inherit the same data center. The activation date for the new farm is set by the user. Changes made since the last save will not be reflected in the original farm. The Remove function deletes the farm when the system is in either the design or inactive state.

The Undo function causes the system to undo the last change. The Redo function, which is available only after an undo has occurred, will redo the change. The Debug function opens a new window that displays internal information that can be useful in debugging. In one specific embodiment, the internal information includes the contents of files containing a text representation of the server farm and other intermediate representations of it.

3.2.3 Change State

The user may change the current state of a farm and carry out other actions using the Change State link. In one embodiment, the Change State link includes a Submit option, Remove option, Activate option, and Deactivate option. By selecting the Submit option, a user may submit a completed farm design for approval. The Remove option causes the system to permanently delete a farm. This action is only available to farms having a current status of Design and Inactive. The Activate option requests an operations organization of Service Provider 126 to turn on a farm from the Standby state. The Deactivate option requests the operations organization to turn off a farm. This may be accomplished by transitioning the farm to the Inactive state or Standby state depending on user input.

3.2.4 Undo and Redo Options

In one embodiment, the editor provides infinite undo and redo functionality for anything done in the editor. Certain operations may be excluded from undo/redo functionality. For example, in one embodiment, the following actions in the editor cannot be undone: Subnet Resizing, Adding Nodes, and Deleting Nodes.

3.2.5 Node Elements Palette

Figure 3B:
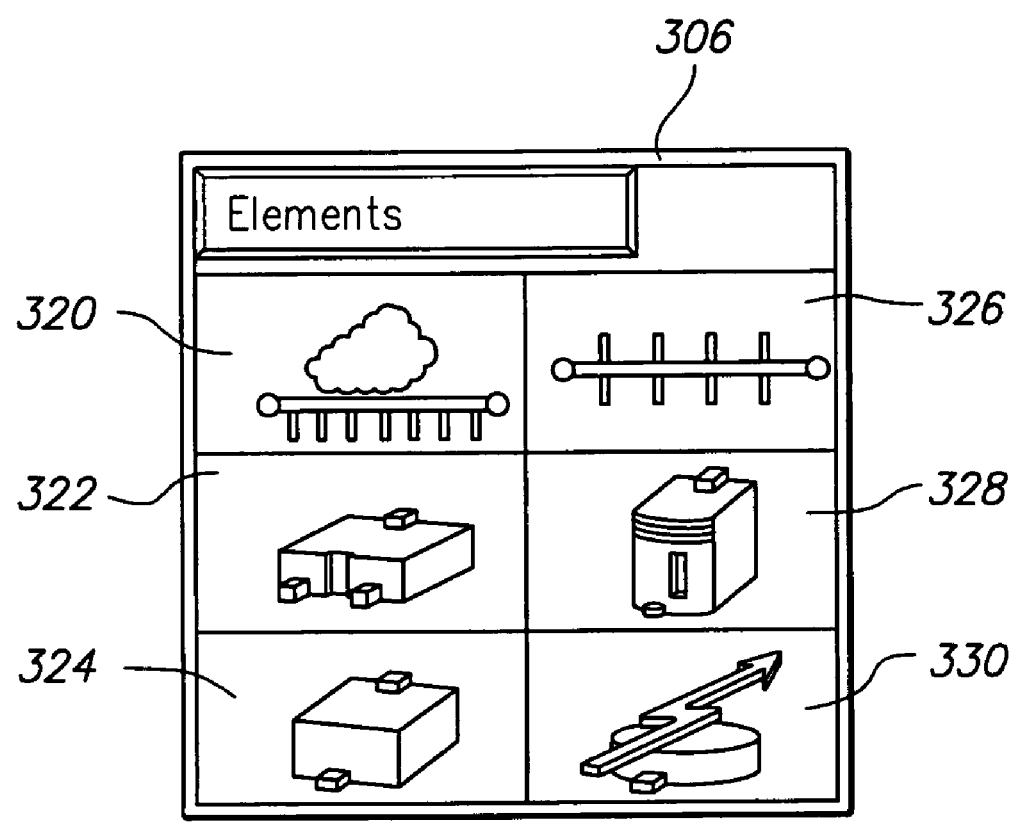
FIG. 3B is a diagram showing an example of a node elements palette that can be used to create instant data centers and server farms.

FIG. 3B is a diagram showing an example of a node elements palette that can be used to create IDCs and server farms. Palette 306 may contain any number of icons that graphically represent computing elements that can be combined to create an instant data center or other computer system. Such icons may represent the global, packet-switched network known as the Internet; a local area network or other sub-network that interconnects the computing elements of an instant data center or other computer system; a firewall device; a load balancing router device; a server device; or other devices.

In this example embodiment, node elements palette 306 includes an Internet icon 320, Subnet icon 326, Firewall icon 322, Load Balancer icon 328, Server/Tier icon 324, and Backhaul icon 330. Other embodiments may include one or more different node element icons and may omit one or more node element icons. A user may define an operable, physical computer system by creating a graphical representation of the computer system in workspace 312 by dragging icons representing computing elements from node elements palette 306, dropping the icons into position in the workspace, configuring the nodes represented by the icons, wiring the nodes together using lines representing wires, and submitting the completed graphical representation to a service provider for validation and instantiation.

4.0 Creating a Server Farm Using a Graphical Editor within the Customer Control Center 4.1 Working with Nodes Each icon in the palette 306 represents a non-instantiated node of a virtual server farm or IDC. When an icon is dragged and dropped into workspace 312, a graphical representation of a new server farm node is created and corresponding information about the node is created and stored. A node is an element from the palette and is a general name to describe any of the farm elements. Each node has one or more ports. A port often represents a network interface card (NIC) for that node, but not always. When it does, it can be interchanged with the word "interface". In general, the port is an object that can receive a connection in a network. Ports are displayed in highlighted form whenever it is possible to initiate or end a wiring connection at the port. The Internet and subnet are "network" nodes and are generally different from the Firewall, Load Balancer, Tier, and Backhaul nodes, which are "hardware" nodes. A node is "designable" when it is in the Design state and when in the Active state, until it is saved.

Figure 3C:
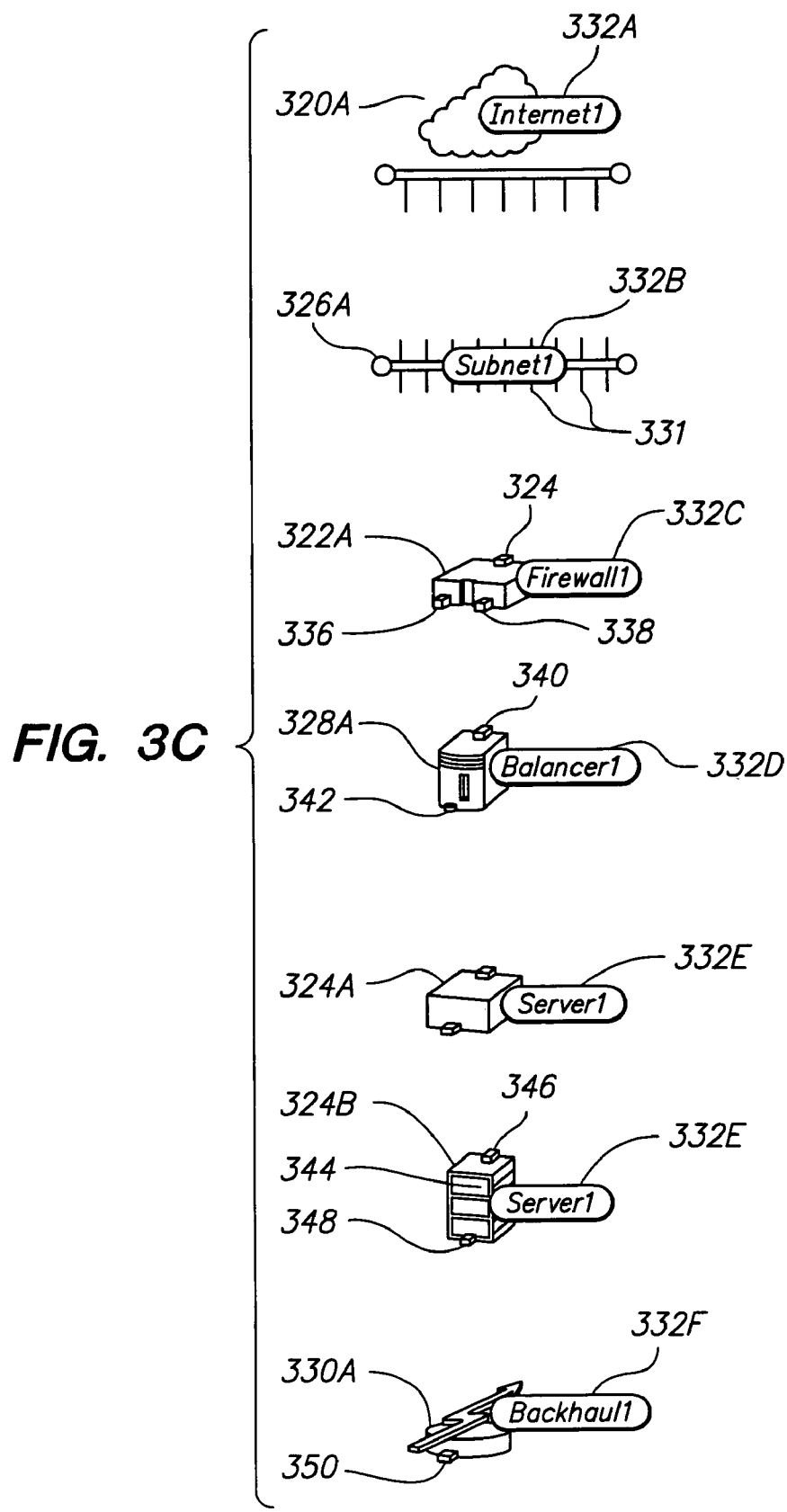
FIG. 3C is a diagram showing examples of instantiated farm nodes showing labels that are applied to farm nodes when they are instantiated.

FIG. 3C is a diagram showing examples of instantiated farm nodes showing labels that are applied to farm nodes when they are instantiated.

The Internet is represented as a cloud on top of a subnet, as in Internet icon 320A, which has label 332A. All IP addresses allocated on the Internet subnet are actually externally visible on the Internet. A subnet node represents a subnet and is indicated by icon 326A having label 332B and a plurality of wiring connections 331. IP addresses allocated on the subnet are only internally visible. In one embodiment, each subnet has a default size of 1,024 IP addresses per subnet. If more wiring connections 331 are needed, a user may drag on the subnet icon in a manner that signals laterally expanding or contracting the subnet icon. In response, the system generates information that re-displays the icon such that the icon has a larger plurality of connection points or fewer wiring connections.

A Firewall is represented by icon 322A, which has example label 332C. A firewall has three ports or interfaces. The upper port 334 is the "Outside" interface, the lower left port 336 is the "Inside" interface, and the lower right port 338 is the "DMZ" interface. A wiring connection to the Outside and the Inside interfaces is required before the farm can be submitted for approval by operations. A connection to the DMZ interface is optional.

Interfaces for all hardware devices are named. For example, the interfaces of a firewall are named "eth0", "eth1", and "eth2". These correspond to "Outside", "Inside", and "DMZ" respectively.

A Load Balancer balances traffic sent to a "virtual" interface and sends it to real interfaces for the purpose of spreading out large amounts of traffic over many servers. A Load Balancer is represented by icon 328A, which has ports 340, 342 and label 332D. A Load Balancer can load balance any element having an IP address, including Servers/Tiers, Firewalls, real and virtual interfaces of other Load Balancers, and backhauls. When a load balancer balances a node, a small "B" icon is displayed in the lower right-hand corner of the icon for the node that is balanced.

The interfaces for a Load Balancer are named "eth0" and "eth1". "eth0" is the upper port 340 and "eth1" is the lower port 342. A connection to eth0 is required. A connection to eth1 is optional. If the Load Balancer has connection to just eth0 then it will balance traffic from that subnet and into the same subnet. If the Load Balancer has both ports connected it will balance inbound traffic arriving at eth0 and send it to the subnet connected to eth1.

A server is represented by icon 324A, and a tier that comprises a plurality of peer servers is represented by icon 324B. In one embodiment, no actual internal distinction is made between a single server and a Tier, and a single server is merely a Tier having one element. In a Tier, the number of servers in the tier is displayed in the form of a numeral 344 on the icon of the tier.

The interfaces 346, 348 to a tier are named "eth0" and "eth1". As for the Load Balancer, the upper interface is "eth0" and the lower interface is "eth1". A server must have a connection to eth0, but a connection to eth1 is optional.

A Backhaul is a virtual private network (VPN), point-to-point connection, plain old telephone service (POTS) connection, or some other connection to an outside resource. A Backhaul is illustrated by icon 330A, having label 332F and a port 350, which is named "eth0" and must have a wiring connection.

Referring again to FIG. 3A, the example workspace 312 includes a graphical representation 314 of a computer system. In representation 314, an Internet icon 320B named "Internet1" is coupled to a firewall named "Firewall1" as indicated by firewall icon 322B. An output port of firewall icon 322B is coupled to subnet 326C, which is coupled to a load balancer 324A. A second subnet 326B interconnects firewall 322B to a server 324C and a backhaul 330B. Servers 324D, 324E are coupled to subnet 326C. Thus, graphical representation 314 represents a complete three-tier computer system. Using the methods described herein, graphical representations of any kind of operable physical computer system, typically in the form of a data center or server farm, may be created and stored. Further, an operable physical computer system having a logical structure corresponding to any such graphical representation (e.g., representation 314) may be instantiated, loaded with one or more software images, and placed in active service to process client requests.

4.2 Wiring

"Wiring" is graphically connecting nodes of a farm together using graphical representations of wires. Referring again to FIG. 3A, wire 301 connects subnet 326C to load balancer 328B, for example. In one embodiment, a user can connect a first node to a second node by single clicking on a port of the first node, and then single clicking on a port of the second node. After the second port is selected, the system displays a graphical representation of a connection of the ports in the form of a line that connects the selected ports on the icons. In one specific embodiment, a hardware node must connect to a network node and vice-versa. Ports of icons are highlighted when a wiring connection is initiated or completed at the ports.

When wires are connected and disconnected, any impact of the connection or disconnection on any applicable Load Balancers or Load Balancer groups takes effect substantially immediately. Similarly, when wires are connected and disconnected, any impact of the connection or disconnection on any applicable Firewalls and the nodes to which they allow and deny access is shown substantially immediately.

4.3 Validation

Each server farm is required to undergo manual validation by operational personnel of Service Provider 126. In one embodiment, each farms is also "pre-validated" before it is submitted to the Service Provider 126 to identify any errors in configuration that a user has introduced. In one specific embodiment, the following checks are carried out:

1. Every node has been configured and the configuration makes sense.
2. Every hardware node has the required wiring connections.
3. Interfaces referenced in a firewall are connected to a subnet.
4. The number of externally visible IP addresses does not exceed the agreed maximum.
5. For active farms, the number of service units the farm is using is less than the agreed maximum.

In the Active state, the farm is validated before every save because saving the farm commits the changes to the control plane.

4.4 Configuration of Nodes

Each node of a server farm that is created by dragging an icon from the palette and dropping it into the workspace requires configuration of one or more parameter values. For all nodes, certain common parameter values are configured, e.g., including Name, Default Gateway, and Notes. In addition, there are specific parameter values that are configured for particular nodes.

In one embodiment, each node has a Name value that is configurable in its configuration dialog. In one specific embodiment, each node name conforms to the DNS naming standard, does not include the terminal sub string 'eth' followed by a number, does not match the DNS names of other devices in a farm, does not contain the DNS name of any firewall defined in the farm, and if the node is a firewall the node Name is not a sub string of the DNS names of other devices in the farm.

When a node Name value is changed, the displayed name of the node in the MapView reflects the change as soon as the user closes the configuration dialog. The name field can only be changed when the node is in the designable state. The Default Gateway value may be configured for a Server Group, Load Balancer, and Firewall node. The Default Gateway value sets an IP address on one of the local subnets to be the default gateway for the device. The user can select from a list of interfaces or choose "None." If a device is on an external subnet (e.g., within the Internet cloud), then the value defaults to the external router for the farm unless the user chooses another device as the default gateway.

The Notes value receives any text information that the user wishes to store in connection with a node for convenience. Thus, the user can keep notes about the node and share information about that node to other users in the same account. They can be altered in any state and contain any character.

Configuration of the foregoing values or other values is carried out using one or more configuration dialogs that are structured using conventional graphical user interface design techniques. Each of the configuration dialogues includes an OK, CANCEL, and HELP button. Selecting the OK button causes the system to accept the changes that the user has made to the node in the configuration window and closes the window. Acceptance of changes means storing the values in a database, or in other data storage. The changes are reflected in the parent window as soon as the window closes. The CANCEL button closes the configuration window and discards any changes the user might have made. The HELP button displays a help system that enables the user to search for further information about the current dialog or other aspects of the system.

Figure 4A:
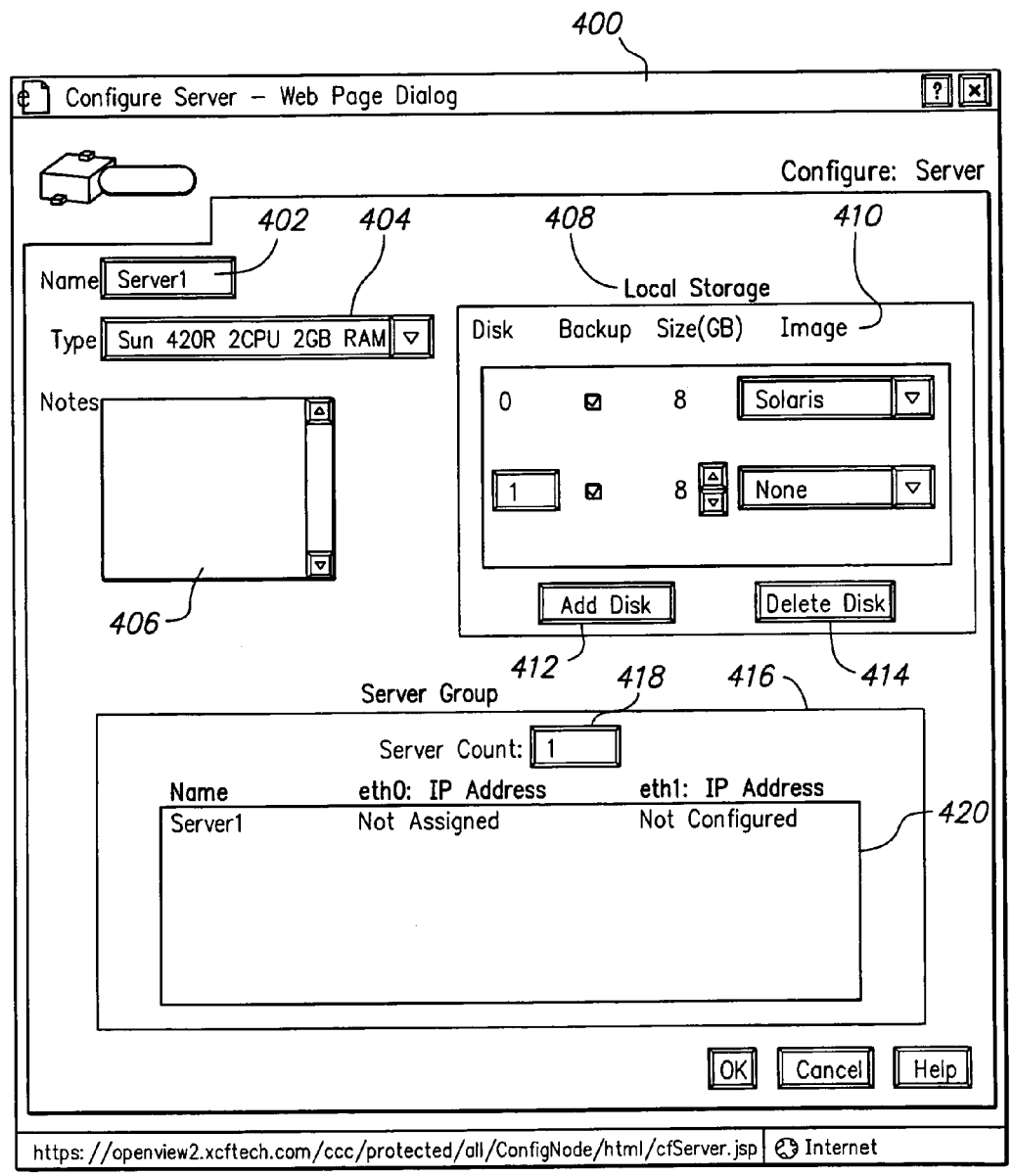
FIG. 4A is a diagram of a server tier configuration dialog that may be used to create or modify one or more parameter values pertaining to a server.

FIG. 4A is a diagram of a server tier configuration dialog that may be used to create or modify one or more parameter values pertaining to a server. A tier configuration window 400 provides access to design and runtime information about a tier and the servers inside the tier as well as configuration of the local storage and software images for server(s) in the tier.

A Name value may be entered in a name field 402. A Type pull-down menu 404 is used to select the type of CPU or other processing element that will be used for the current server when the current server is actually instantiated in a real-world IDC or server farm. The options in the pull-down menu 404 reflect one or more different server types that are then currently available for use for the current server node. The Notes field 406 receives text notes of any format that is meaningful to the user.

A Local Storage pane 408 includes fields that receive information that defines a configuration of data storage elements in the form of disk storage or any other form of data storage. As indicated by title bar 410, each disk assigned to a server tier node includes a disk number value, backup flag, size value, and image value. The disk number value uniquely identifies the disk; all tiers must have at least a disk zero, which serves as the boot volume for the server. In one embodiment, the user may enter a disk number for the volume. Disk volume numbers must be between 0 and 6 inclusive. The user may add no more than 6 disks to any machine.

The backup flag indicates whether the system should periodically back up the contents of the associated disk. The size value indicates the size of the disk. Disks can be sized by clicking on the up/down arrows next to the disk size value.

The image value is selected from a pull-down menu and identifies one of a plurality of pre-defined disk images to apply to the disk. A disk image can contain boot information, an operating system, applications, and associated configuration data.

In one specific embodiment, the boot volume (Disk 0) of a machine has a pre-defined, fixed size and can only have images that are that size installed on it. For example, the fixed size may be 8 Gb, 9 Gb, etc. Additional disks can be added and removed when the Tier is in the design or active states using Add Disk control 412 and Delete Disk control 414. The size of an image (if any) installed on a disk must match the size of the disk. If the size is changed, then the image value changes to "None." If the user selects an image that doesn't match the size of the disk, then the disk resizes accordingly.

In the pending, standby, and inactive states, the local storage information is displayed to the user in an un-editable fashion, e.g., in grayed-out format.

If the type of the machine changes while the Tier is designable, then the images may change to match the architecture of the machine. For example, if the Type value of a server is changed from a Sun CPU to an Intel x86 compatible machine, and the previously selected Image value specifies a Solaris boot image, then the Image value changes to specify a boot image that is compatible with the x86 machine. Alternatively, if the current image applied to a disk doesn't apply after the user changes the type of the machine then the image defaults to "None." The possible images displayed for a disk match the Size value and the Type value of the server.

A Server Group pane 416 includes fields that identify the number of servers in the current server group or tier. In the design and active states the user may change the number of servers in the Server Group. In one embodiment, the number of servers is changed by entering a value in a Server Count field 418. The names and IP addresses of servers that are currently within a server group are listed in a table 420. If the IP address is not available, then table 420 displays the value "not assigned" for the table.

The name of the servers is linked to the name of the Tier and is reflected in the dialog as the user changes the name of the tier.

Figure 4B:
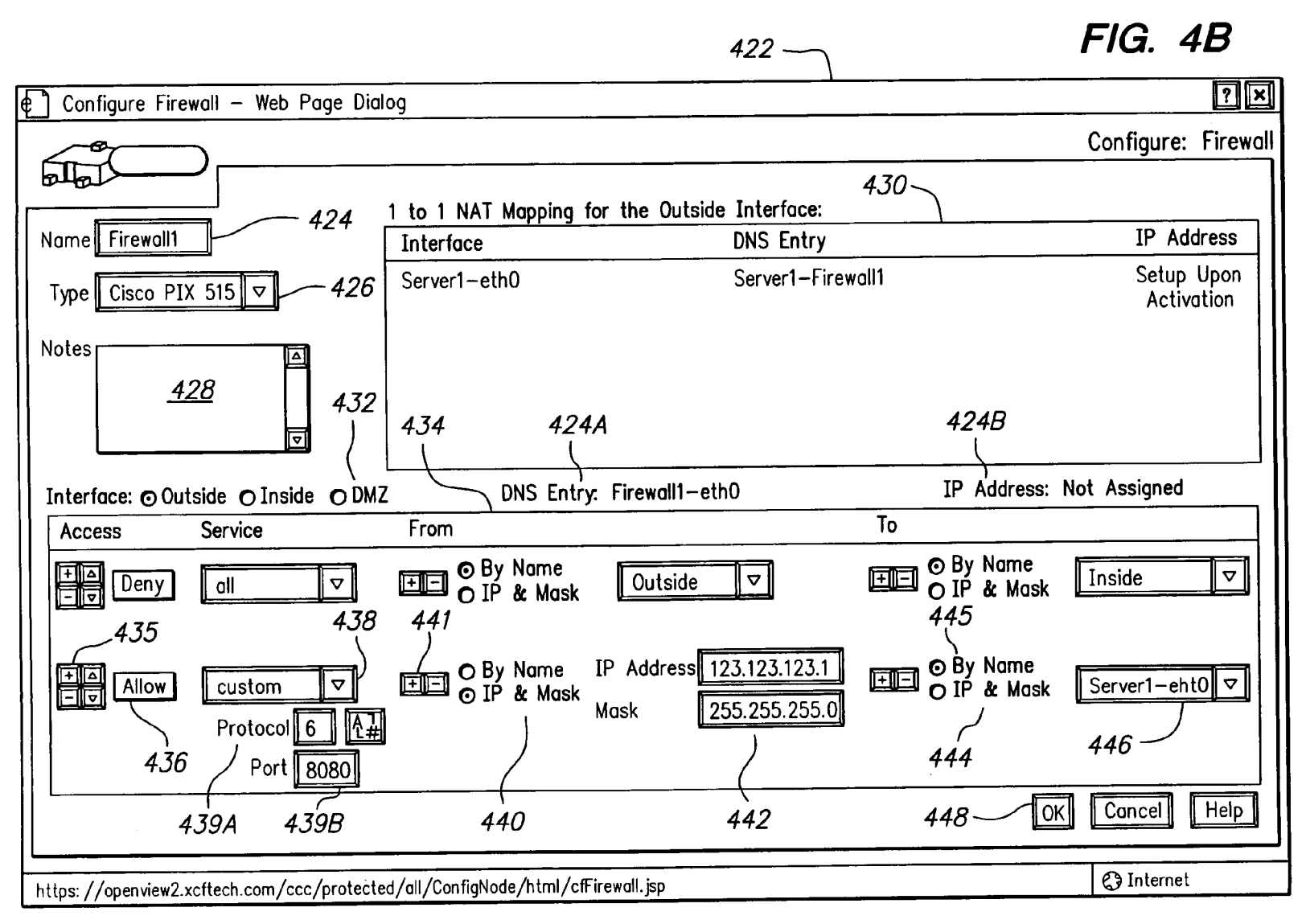

FIG. 4B is a diagram of a firewall configuration dialog that may be used to create or modify one or more parameter values pertaining to a firewall. Configuration of a firewall involves providing the name and type of the firewall and one or more access rules for each interface of the firewall in one or more data entry fields of a configuration window 422. Configuring the DMZ port is optional, because it does not have to be wired to any subnet. In one embodiment, one interface is configured at a time by selecting the interface using Interface radio buttons 432. In response to selecting an interface using radio buttons 432, one or more rules are displayed in a Rules Display 434, and a network address table is displayed in NAT display 430, and correspond to the interface that is currently being edited.

A Name field 424 receives a name value for the firewall. A DNS Entry field 424A displays the name of the firewall node as it will appear in DNS records. An IP Address field 424B indicates the current IP address of the firewall, or the value "Set Upon Activation" if the associated server farm is not active. A Type field 426 receives a firewall type value selected from a pull-down menu that lists available firewall types. An example of a firewall type is "Cisco PIX Firewall." A Notes field 428 receives any notes text that the user wishes to enter Network Address Translation (NAT) Mapping pane 430 gives a view of the DNS and IP allocation for the interface that is selected using radio buttons 432. For each interface that is given access inside of a firewall interface's rule configuration, there is an IP address allocated on the same subnet as the current interface. A DNS entry is created for that IP address. If there is no IP address allocated for that NAT interface, then the pane 430 displays the value "Not Allocated" when the firewall node is in the active state, or the value "Set Upon Activation" if the farm is inactive. The information in the pane 430 appears and disappears as the user modifies the rule configuration.

Configuration window 422 also includes an Interface Rule Configuration pane 434. When a firewall node is Editable (while editing in the Design and Active states), parameter values relating to one or more interface rules may be entered. There must be at least one rule defined per interface, but there is no maximum. When the firewall node is non-editable, e.g., in all other states, the Interface Rule Configuration pane 434 displays a table of then-existing interface rules. The table includes, for each rule, an access value (Allow or Deny), a Service value (e.g., www, ftp, etc.), and DNS names of source and destination nodes to which the rule applies (e.g., "From Outside . . . To Balancer1-vip0).

In Interface Rule Configuration pane 434, when a firewall node is Editable, the graphical user interface includes the following features as shown in FIG. 4B. For each rule, an Access Widget 435 enables the user to order the associated rule, add a new rule, or delete the current rule. Specifically, selecting the "+" or "−" elements of the Access Widget 435 causes the system to add a new rule or delete the current rule, respectively. Selecting the up-arrow or down-arrow element causes the relative position of the associated rule in pane 434 to change up or down, respectively.

An Allow/Deny button 436 toggles between the two different types of firewall traffic access, allow and deny, when clicked. A Service Field 438 enables the user to select a service by name or define a custom service. If the user selects "custom," then a Protocol input box 439A and a Port input box 439B appear. In response, a user may enter a port value and protocol value. For example, a valid protocol value is an integer between 0 and 255 inclusive. The protocol also can be selected by clicking on a protocol selection icon, which allows the user select a protocol by name. A valid port value is an integer between 0 and 65535 inclusive.

"To" and "From" Fields 444, 440 respectively enable the user to specify endpoints of traffic that is controlled by the access rule. Clicking on a plus button 441 will add another "to" or "from" value specification for the rule, and clicking on the associated minus button removes the current "to" or "from" value specification. There must be at least one "to" and one "from," and there is no maximum.

Access values pertaining to traffic direction (to and from) may be done by specifying a node name or by specifying an IP value/mask pair 442, as indicated by radio buttons 445 in the case of a "To" value. Selecting the "By Name" radio button 445 indicates that the user wishes to choose an interface 446 that exists in the farm. Any interface 446 can be selected, but when the firewall configuration is submitted using OK button 448, that interface 446 must be then currently wired to a subnet. If one of the "special" interfaces 446 is selected (e.g., the "outside", "inside", and "dmz" interfaces that refer to eth0, eth1, and eth2, respectively, of the firewall that is being configured), then the rule refers to all traffic that incident to that interface 446. If a node's interface is referenced inside a firewall's rule configuration, then that node cannot be removed. In contrast, if the "By IP & Mask" radio button 445 is selected, then the user may specify a valid IP address and net mask for the current access specification.

Figure 4C:
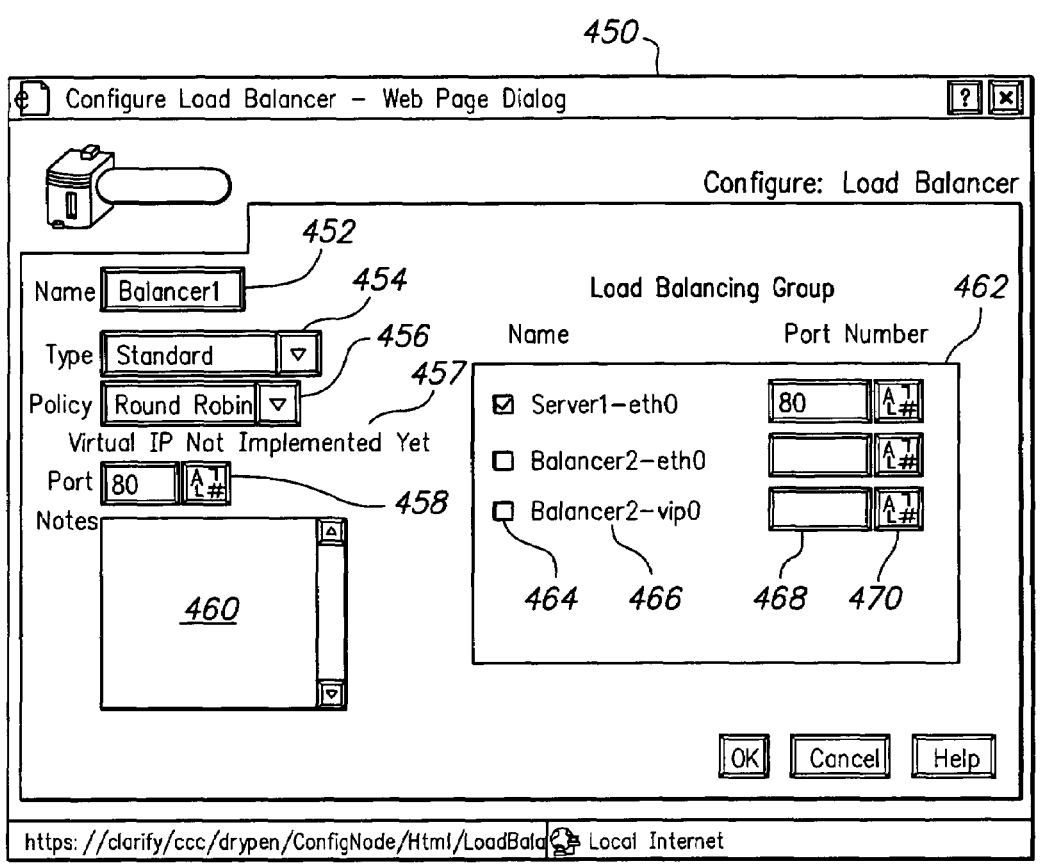
FIG. 4C is a diagram of a load balancer configuration dialog that may be used to create or modify one or more parameter values pertaining to a load balancer.

FIG. 4C is a diagram of a load balancer configuration dialog that may be used to create or modify one or more parameter values pertaining to a load balancer. Configuring a load balancer node involves providing one or more configuration parameter values in fields of a configuration dialog window 450. Within Window 450, a Name field 452 receives a value of a name for the load balancer node. A Type field 454 is a select box giving possible Load balancer types. This field is modifiable when the node is designable. A Policy field 456 receives a value indicating the type of load-balancing policy that the load balancer should apply. The balancing policy that will be applied to traffic to the virtual IP of this load balancer. This field is modifiable when the node is editable. Examples of load balancing policies include Round Robin, etc.

A Virtual IP Address field 457 receives values indicating the VIP address of the load balancer; the actual load balancer may be displayed in the interface window, if desired. The control plane assigns these values, which are displayed in the active state. In other states, the Virtual IP Address field 457 displays the message "Set upon activation". If the eth1 interface is not wired to a subnet then the value reads "Not Configured".

A Port field 458 holds a value that identifies the IP port to balance incoming traffic on. This field is modifiable in the Design and Active states. The Notes field 460 receives user note information.

A Load Balancing Group pane 462 displays information about all interfaces of the load balancer, including real and virtual interfaces. Each interface has a checkbox 464, name value 466, and a port number field 468 with an associated selection widget 470. The user can choose to balance traffic to a named interface by checking the checkbox 464 and entering a port that on which the server expects traffic in port number field 468. Selection widget 470 may be used to select a port value based upon a name rather than a number. This field is modifiable in the Design and Active states. The port text entry box is disabled when the interface is not checked to indicate that it is balanced.

Figure 4D:
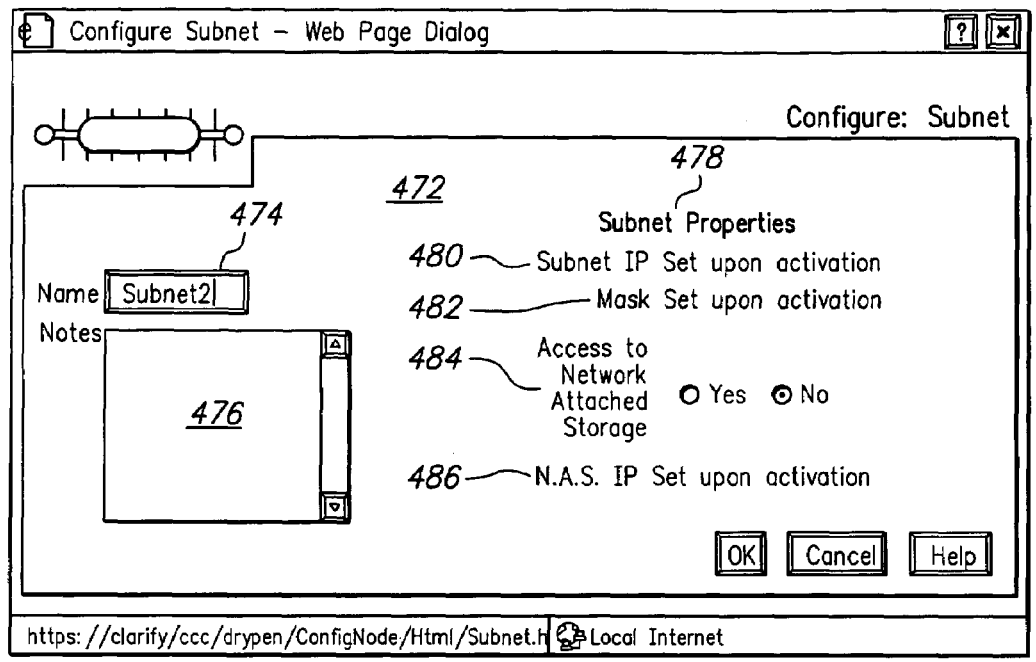
FIG. 4D is a diagram of a subnet configuration dialog that may be used to create or modify one or more parameter values pertaining to a subnet.

FIG. 4D is a diagram of a subnet configuration dialog that may be used to create or modify one or more parameter values pertaining to a subnet. Configuring a subnet node involves entering one or more values in configuration window 472. Within the window 472, a Name value 474 displays or receives a name of the subnet node. Notes field 476 receives user notes information.

Subnet Properties values 478 indicate specific parameters of the subnet. In one embodiment, a Subnet IP field 480 indicates the base IP address for nodes on this subnet. The value is determined by the control plane and displayed to the user when the farm is in the active state. A Subnet Mask field 482 identifies the net mask that will be applied to nodes on this subnet. The value is determined by the control plane and displayed to the user when the node is in the Active state. An "Access to Network Attached Storage" radio button 484 determines whether or not the nodes on this subnet have access to network attached storage. An N.A.S. IP field 486 identifies the IP address where the network attached storage can be found. The value is determined by the control plane and displayed to the user when the farm is in the active state.

Figure 4E:
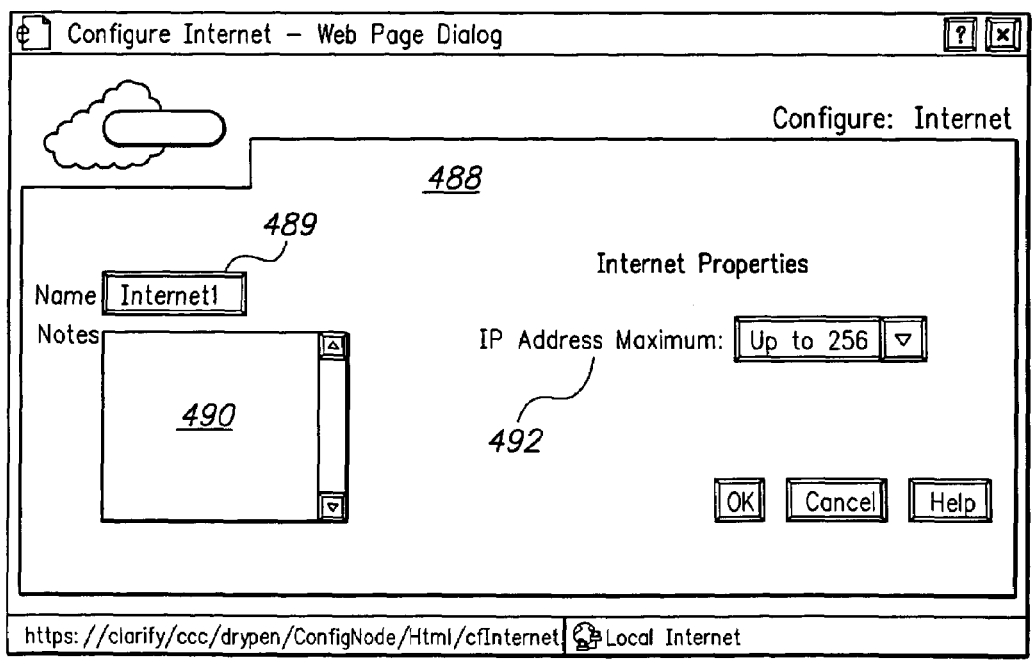
FIG. 4E is a diagram of an Internet configuration dialog that may be used to create or modify one or more parameter values pertaining to an Internet connection.

FIG. 4E is a diagram of an Internet configuration dialog that may be used to create or modify one or more parameter values pertaining to an Internet connection. Configuring an Internet node involves entering one or more values in configuration window 488. Within the window 488, a Name value 489 displays or receives a name of the Internet node. Notes field 490 receives user notes information. An IP Address Maximum field 492 receives a value indicating the maximum number of externally visible IP addresses that are allocated for this farm. For example, a maximum value could be 1024.

Figure 4F:
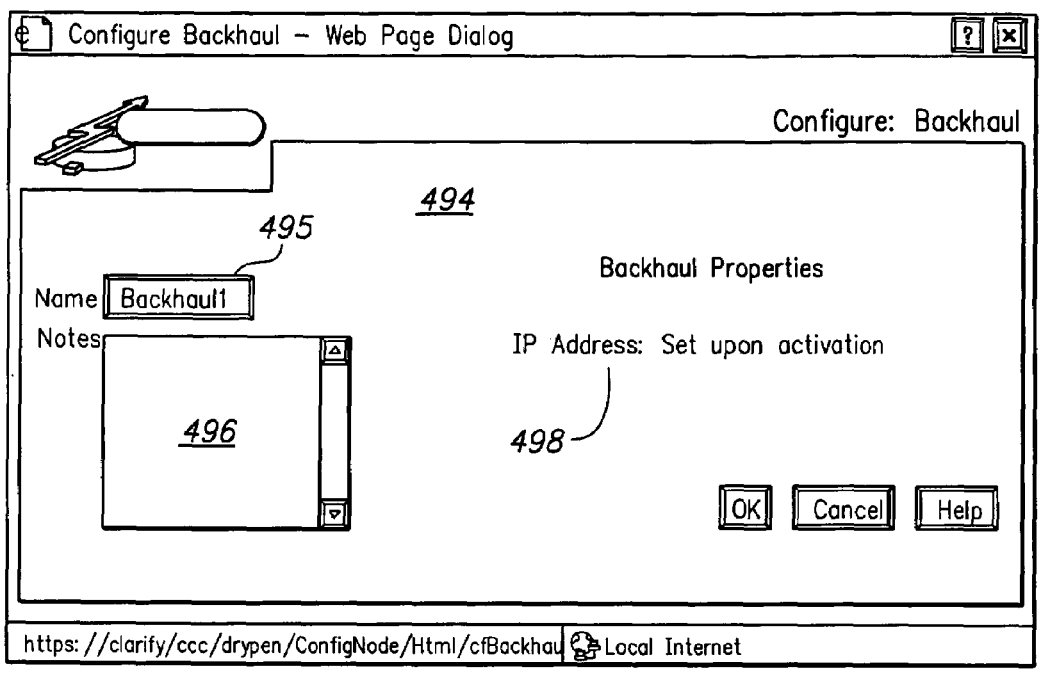
FIG. 4F is a diagram of a backhaul configuration dialog that may be used to create or modify one or more parameter values pertaining to a backhaul connection.

FIG. 4F is a diagram of a backhaul configuration dialog that may be used to create or modify one or more parameter values pertaining to a backhaul connection. Configuring a backhaul node involves entering one or more values in configuration window 494. Within the window 494, a Name value 495 displays or receives a name of the subnet node. Notes field 496 receives user notes information. IP address field 498 identifies the IP address of the backhaul node. The value is determined by the control plane and displayed to the user when the farm is in the active state.

4.5 Server Images

A server image is a collection of information that identifies a combination of programs and data that are associated and that may be collectively written to a disk or other storage device. Using a server image, a user can rapidly cause an instant data farm to operate with a pre-defined set of program software and data that carry out specific functions. For example, a server image could comprise an operation system, Web server, a particular set of Web applications, plus all configuration files and related data that make them interact in a desired way.

4.5.1 Creating Server Images

To create one or more server images, one or more operating systems, applications, data and support files that comprise the image are initially loaded onto a disk that forms a part of an IDC or farm. Thereafter, information identifying the image is associated with the image in the CCC database and a copy of the image is saved for future re-use.

Figure 6A:
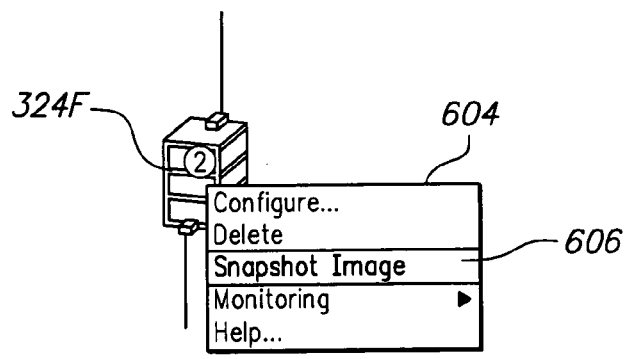
FIG. 6A is a diagram of an example of a context menu that is displayed in association with a server to which the context menu relates.

FIG. 6A is a diagram of an example of a context menu that is displayed in association with a server to which the context menu relates. In one embodiment, to create information in CCC that identifies an image, a user can right-click on a server or server-group in a farm (with the Farm Editor in the 'Edit' mode), such as server 324F of FIG. 6A, and select the 'Snapshot Image . . . ' option 606 from the context menu 604 that pops up.

Figure 6B:
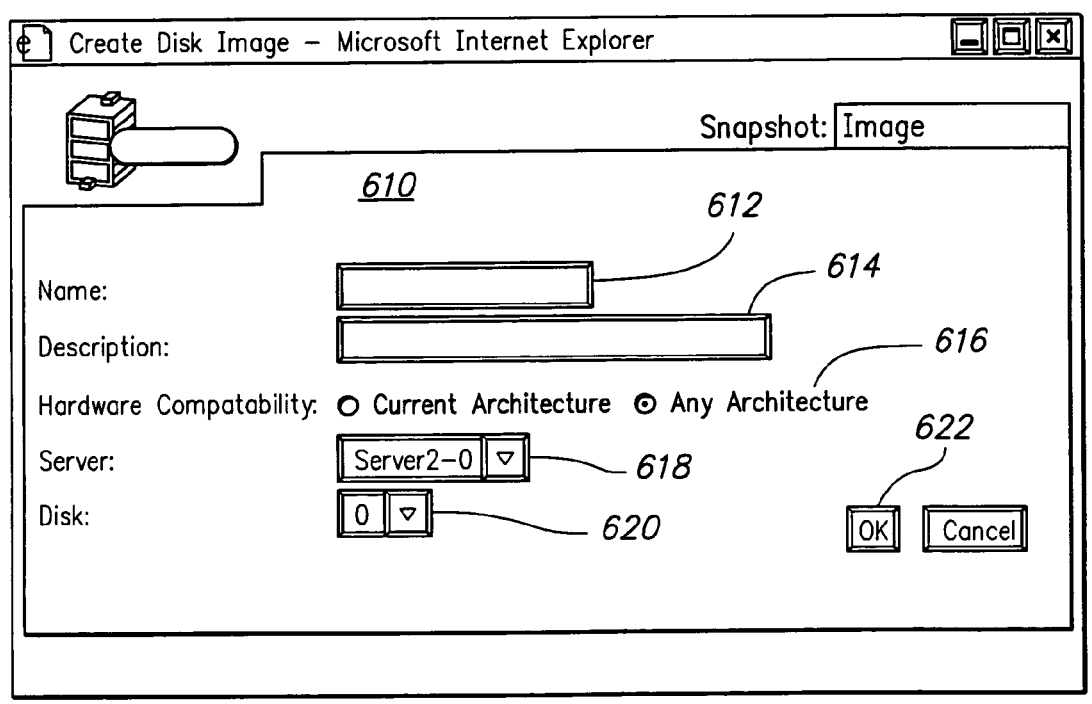
FIG. 6B is a diagram of an example 'Snapshot: Image' window that opens in response to the selection from the context menu of FIG. 6A.

FIG. 6B is a diagram of an example 'Snapshot: Image' window that opens in response to the selection from the context menu of FIG. 6A. In one embodiment, defining a server image involves entering data values in the fields of Snapshot Image window 610. For example, a unique name value is entered in Name field 612. Description field 614 receives a brief description of the image. Hardware Compatibility radio buttons 616 are used to identify the hardware architecture required for the image in terms of whether the current architecture should be 'tied' to the image or whether any architecture is allowed at time of deployment. Server field 618 receives a value indicating which specific server in the current server group is the source of the disk image. Disk field 620 is used to indicate which disk volume of the server identified using Server field 618 is to be used for image creation.

When 'OK' button 622 is selected, the system validates the information entered in window 610 before the information is committed. For example, if there is a name conflict, the user is asked to provide a different name for the image. Once the image has been successfully saved, it is available for deployment on any server in the account. This can be verified by checking the 'Image' selection list of 'Configure Server' dialog for any server or server group (also referred to as 'Tier'). Server disk images (names and other configuration information) can be viewed and deleted from within the Accounts pages.

4.5.2 Server Image Management

In one embodiment, server images are account-specific entities and can be used across farms within the same account. Creation of an image of a server disk is described further herein in the next section. Saved images can be deployed on servers and server groups through their configuration dialogs, as described above. To view or delete server disk images, a 'Server Image Management' window of the user account pages is used.

Server disk images can either be deployed on some server(s) within the account or may not have been used yet. From a management point of view, only unused images can be deleted. Therefore, the 'Delete Image From Account' button on the page is non-operational for images that have been deployed in the account farms.

Based on the above description of images, the user can view either all images or only the unused images by selecting from the radio buttons on the top of the page. Clicking on an image name displays its description in the 'Description' window of the page. Also, if the image is in use, information on the hardware on which the image is deployed is displayed in the 'Currently Installed On' window. A user can sort the 'Image List' and 'Image Details (Currently Installed On)' tables in ascending or descending order based on any field. This can be achieved by clicking on the field of interest.

4.5.3 Load Balancer and Firewall Snapshot

In one embodiment, a user can store information that identifies a current configuration of a firewall or load balancer, so that the configuration information can be applied to other firewalls or load balancers of other IDCs or farms in the user's account. This process is called taking a "snapshot" of the configuration of the firewall or load balancer. To store a snapshot, a user may right-click on a firewall or a load balancer in the Farm Builder page (Editor) and select a "Snapshot . . . " option from the context menu that is displayed in response. In response to selection of the Snapshot option, a Snapshot Configuration window is displayed. The window provides a message to the user that confirms that the system is about to store a snapshot of the configuration of the current firewall or load balancer node. If the user selects 'Snapshot Now,' the system sends a request to the server to snapshot the current firewall/load balancer and stores configuration information as the snapshot.

5.0 Administrative and Support Functions

5.1 Monitoring

Monitoring is the real-time observation of an active IDC. Monitoring functions provide real-time status information about each IDC and its associated elements. Monitoring may result in creating one or more events in response to monitored conditions, including alerts or notifications. The Monitoring function may be implemented, for example, using Hewlett-Packard OpenView. The function may provide monitoring information for applications (e.g., Oracle database, transaction chains, FTP, email, URLs and URL transaction monitors), servers (e.g., CPU utilization, disk space, memory, network, server services, Web server monitors), network monitors (e.g., DNS, ping, port, and SNMP monitors), etc. Advanced monitors may include a composite monitor, directory monitor, file monitor, LDAP monitor, link check monitor, log file monitor, news monitor, NT Performance/Dialup/Event monitor, script monitor, URL list and content monitor, etc.

A related sub-function may provide customer configuration of alerts and notifications that they want to receive when monitored item reaches predefined thresholds or fails, and how they want to receive them (e.g., email, pager, telephone).

Another function may provide reports on the status and performance of IDCs. Reports are defined as statistical information that is collected over a specified period of time, or the ability to view such information for a specified time period. Whereas monitoring is provided in real time, reports are focused on creating logs and archives of data that interests a customer. For example, the system may generate the following reports: Reports on any of the monitors described herein; traffic patterns; bandwidth usage; active IDCs; customer support history. In one embodiment, there is a customer report request interface that enables a user to view reports using a browser, send reports via email, export of report data for external processing, and access a menu of reports.

In one embodiment, a user configures and edits node-based and farm-based monitors and alarms by use of dialogs that are initiated from the Farm Editor page. Specifically, node monitor and alarm configurations can be initiated currently from the Farm Editor page in the 'Edit' mode or in the 'Monitor' mode, while those for the farm can be initiated in the 'Monitor' mode. The dialogs may be accessible from other pages and/or other modes of the Farm Editor page. Additionally, monitors and alarms may be configured for a farm in only the 'Design' and 'Active' states.

Node monitor and alarm dialogs may be initiated by using a context menu that is accessed, for example, by right-clicking while positioning the mouse pointer on a node, in the Farm Editor page. In one embodiment, it is possible to configure node monitors for servers only, but this limitation is not required. Farm monitor and alarm dialogs may be initiated by clicking on 'Farm Monitors' and 'Farm Alarms' buttons on the Farm Editor page ('Monitor' mode). In one embodiment, such buttons enforce a logical sequence wherein defining an alarm requires the prior configuration of the monitors that the alarm needs to be based on.

Configuring Monitor Dialogs for a Node or Farm involves entering one or more configuration parameter values in graphical user interface configuration dialogs. A 'Variable' selection list provides a list of monitors that the user may potentially define for the node or farm. To define/configure a monitor, the user selects the units, the applicable relational operator, the 'Warning' and 'Error' threshold values and the sampling interval for the monitor. Only integer values are accepted for the threshold values and sampling interval values.

In one embodiment, the color variable name text changes to 'red' when the user positions the cursor inside a threshold or sample interval text box, and then moves the cursor focus elsewhere without providing any values in these text boxes.

This function brings the user's attention to the fact that the indicated variable field was not provided with a required value. The variable color switches back to the original color once the user returns the cursor back to the text box.

The monitor configuration dialogs each include an Apply button, OK button, Cancel button, and Help button. The 'Apply' button causes the system to save the configuration of the currently selected monitor. The OK button causes the system to save the configuration of the currently selected monitor, then exit. The 'Cancel' button causes the system to exit without saving any changes to the currently selected monitor. The 'Help' button displays help on the dialog. Also, the dialog saves a monitor configuration only if it is properly configured, i.e., the thresholds and sample intervals are specified.

If the user attempts to select a different monitor from the 'Variable' selection list without saving any changes to the current monitor, the dialog prompts the user for saving the changes to the currently-selected monitor before displaying the requested monitor.

Configuring a new alarm for a node or a farm has three prerequisites: (a) monitors are configured on the node or farm, (b) notification classes are defined for the account and (c) a new alarm needs is created first. For editing a pre-configured (and previously saved) alarm, all three criteria are satisfied automatically. If the current node or farm fails to satisfy such criteria, the configuration dialog provides appropriate prompts.

In the Configure Node Alarm and Configure Farm Alarm dialogs, an alarm may consist of multiple "notifiers," instances of which are created by a 'New Notifier' button. Each notifier may have its own 'Notification Class', 'Notify After' and 'Re-arm After' values (both integers) and one or more monitor conditions that will be used to trigger the alarm. Monitors conditions can be appended and removed using the '+' and '−' buttons, respectively, and can be combined using the logical 'and' and 'or' operators. The 'Delete Notifier' button deletes the associated notifier. Delete Alarm deletes the alarm completely.

When an alarm is configured for the first time, it is instantiated with no notifiers. Notifiers and associated monitor conditions are added using the appropriate buttons described above.

Providing valid (i.e., integer) values in the 'Notify After' and 'Re-arm After' text boxes signifies a completed notifier, as the remaining selection lists have pre-selected values associated with them. Thus, users generally select the options on these selection lists if the pre-selected values do not meet their requirements for the notifier. Additionally, users may remove any superfluous conditions that they may have added to a complete notifier but do not want them to be included in the alarm configuration.

In one specific embodiment, the text color of the variable names ('Notify After' and 'Re-arm After') changes to 'red' when the user positions the cursor inside the corresponding text box, and then moves the cursor focus elsewhere without providing any values in these text boxes. This brings the user's attention to the fact that the indicated variable field was not provided with a required value. The variable color switches back to the original color once the user returns the cursor back to the text box.

If the user attempts to select a different alarm from the 'Variable' selection list without saving any changes to the current alarm, the dialog prompts the user for saving the changes to the currently-selected alarm before displaying the requested alarm.

An Edit Contact Group Dialog is used to create a valid Contact Group with a set of valid Users of an account. The dialog displays all the users of the account all the time and allows the user to create new Contact Group and then add/remove users to/from the group. The Dialog allows the user to remove a Contact Group from the account.

In one specific embodiment of the Edit Contact Group Dialog, selecting the "create new" option of the dropdown list for Contact Groups creates a new Contact Group. After selecting to create a new Contact Group the user may decide not to by clicking cancel on the Create Contact Group Dialog. Selecting a Contact Group and clicking the "Remove Contact Group" button will delete a contact Group. Users can be added to a Contact Group by using the "add" arrow and removed by using the "Remove Selection" button in the dialog. Users cannot add or remove user without selecting a Contact Group. Making changes to a Contact Group and then selecting a different one will ask the user for confirming the commit of changes made to the Contact Group. Clicking the "Show All Groups" button will display a dialog with all the valid groups pertaining to that account.

The user may click "OK" to save the uncommitted updates to the Contact Group, this will close the Dialog after committing the changes, or the user may chose to click "Cancel" to close the dialog without committing the updates on the last Contact Group.

An Edit Notification Class dialog is used to create a valid Notification Class with a set of valid Contact Groups of the account. The dialog displays all the Contact Groups of the account all the time and allows the user to create new Notification Class' and then add/remove Contact Groups to/from the class. The Dialog allows the user to remove a Notification Class from the account.

In one specific embodiment of the Edit Notification Class Dialog, selecting the "create new" option of the dropdown list for Notification Class creates a new Notification Class. After selecting to create a new Notification Class the user may decide not to by clicking cancel on the Create Notification Class Dialog. Selecting a Notification Class and clicking the "Remove Notification Class" button will delete a Notification Class. Contact Groups can be added to a Class by using the "add" arrow and removed by using the "Remove Selection" button in the dialog. Users cannot add or remove Contact Groups without selecting a Notification Class. Making changes to a Notification Class and then selecting a different one will ask the user for confirming the commit of changes made to the Notification Class.

The user may click "OK" to save the uncommitted updates to the Notification Class, this will close the Dialog after committing the changes, or the user may chose to click "Cancel" to close the dialog without committing the updates on the last Notification Class.

A Main Monitoring Page shows real-time monitoring data for monitors that have been configured on an active farm. Thus, this page can be triggered/launched for only farms in active states. The page may be launched from the 'Monitor' option in the context menu that is obtained by right-clicking a node in the farm editor monitoring page and the home page.

Monitoring information is displayed in the form of a table for the monitors that have been defined for the server or server group by using the Configure Monitor Dialogs. For a server group, aggregated monitor values are displayed by default. Thus, for example, a CPU utilization for a server group reflects utilization for the entire group as a whole. Monitoring information for the individual servers that make up the server group can be displayed by clicking on a right arrow icon immediately preceding the aggregated monitor. The aggregated monitor can be collapsed back into the default state by clicking on a down arrow icon next to it. For each monitor, monitoring states are displayed for its current state as well as for historical data, e.g., low and high values for the time period specified in the drop-down list. Only current state is displayed for aggregated monitors.

In one specific embodiment, the monitors can be sorted by 'Name' or by 'Current Value' by clicking on the table cells labeled accordingly. Additionally, the sorting can be alternately changed between ascending and descending order. A sorting icon indicates the current order that is used for the display with an 'up arrow' (for ascending) or 'down arrow' (for descending) icon in the table cell. Selecting the table cells with the monitor names displays details of the monitor on the lower part of the page. The details comprise the information that was saved while configuring the monitor for the server (or server group) using the 'Configure Monitor Dialogs' (Section 5.2). This information can also be hidden by clicking on the 'Hide Details' button and re-displayed by clicking on the 'Show Details' button that appears when the details are no longer displayed.

The monitoring page can be printed to facilitate record keeping for the user.

5.2 Reporting

The reporting function may also enable customers to select the reports they want to access, and may provide the ability to specify dates or ranges of dates for reports to cover. The reporting functionality may also enable a user to schedule automated generation of reports, e.g. weekly/monthly traffic reports and weekly/monthly billing reports.

5.3 Back-Up and Restore Management

In one embodiment, a back-up and restore management function provides a mechanism for customers to manage backup and restore activities. The back-up and restore management function may enable a user to schedule backups (e.g., daily incremental backup, weekly full backup, monthly off-line backup). Preferably, there is an interface to a separate customer care system for management of requests. An example of a customer care system is the Remedy system. A description of a specific implementation of a customer care system is described further herein in the section entitled "CUSTOMER SUPPORT FUNCTION."

5.4 Service and Account Administration

Creation of customer accounts may include: creation and management of customer accounts; providing a data entry template and fields for customer information; and creating and storing selected levels of access privileges for users. In one embodiment, creation of a customer account is a preferred means by which a new customer is registered in the system. Creation of a customer account can be carried out by an employee of Service Provider 126 in the presence of a customer, or by telephone, or by a customer itself. In the registration process, customer identifying information is entered and stored, e.g., customer name, customer title, company name, company address, company phone number, customer contact information, customer email address, marketing information login password, etc. A customer is then designated as possessing one or more of the roles identified above. Creation of customer accounts may be carried out using application software from the Clarify eBusiness Applications unit of Nortel Networks, San Jose, Calif.

In one embodiment, accounts pages allow end users to manage the account information of the company, including user login and contact information as well as company information. In addition, the pages allow administrators to add and remove user accounts and also to manage server images. The pages are launched from a link in the top right corner of the Farm Editor pages. The pages consist of six components (and hence six pages): User Information, Account Information, User Management, User Groups, Contact Groups and Server Image Management. Each of these is described in detail in the following sections.

Clicking on the Account link on the Farm Editor pages launches a new browser window that defaults to the 'User Information' page. End users are categorized into one of two categories: 'Super User' or 'IT Architect'. Users in both categories have the capability to edit their personal information ('User Information'). However, only Administrators have the capability to edit 'Account Information' and manage the account users through the 'User Management' page. In addition, users with 'Super User' privileges have the ability to manage 'User Groups', 'Contact Groups' and 'Server Images' in their respective pages. Accordingly, users that have "IT Architect"-level access privileges are not allowed access to these capabilities and are able to access the account page in read-only mode.

A User Management page is provided. Only account 'Super Users' have access to this page. This page allows the active management of account users, such as addition and removal of users from the account. Depending on the operation being performed, this page can take three forms: a 'User Management-Information' page that describes all the user management operations, a 'User Management-View User Information' page that displays user information in read-only mode (with the ability to 'Remove' the user from the account) and a 'User Management-Add User' page to add new users to the account.

The 'User Management-Information' page is the default page displayed when the 'User Management' button is pressed or after a new user has been successfully submitted to the server. It displays information that describes the scope of the user management feature set and the operations that need to be performed to achieve the desired functionality. In addition, it displays the list of users registered for the account. The 'Remove' button is not functional in this page view as no user has been selected yet for removal. The 'Add User' button can be used to bring up the 'User Management-Add User' page.

A user is selected by clicking on the name of the user in the user list. In response to selection of a user from the user list, the system displays the 'User Management-View User Information' page. This page can be initiated from any 'User Management' page because the user list is available and active in all three pages. The page displays user information for the selected user in read-only mode. The 'Remove' button deletes the user account of the selected user. The 'Add User' button can be used to bring up the 'User Management-Add User' page.

The 'User Management-Add User' page is used to add users to the account. Some of the fields are required fields and are labeled so accordingly. The User Group page is used to create a valid User Group with a set of valid Users of the account. The page displays all the users of the account all the time and allows the user to create new User Group and then add/remove users to/from the group. The Page allows the user to remove a Contact Group from the account.

Selecting an option of the list for User Groups displays the details of the Group. When the add User button is selected, the system prompts the user to enter a name for the Group and the named user is added to the Group. Selecting a User Group and clicking the "Remove" button will delete a Group. Users can be added to a User Group by using the "add" arrow and removed by using the "delete" arrow in the page. Users cannot add or remove user without selecting a User Group. Changes to a User Group are committed to the system when the Save Changes button is clicked, whereas the Reset button will reload the page, and the "Close" button will close the page without committing the latest updates.

A Contact Group page is used to create a valid Contact Group with a set of valid User Groups of the account. The page displays all the User Groups of the account and allows the user to create new 'Contact Group' and then add/remove Contact Groups to/from the account. The page allows the user to remove a Contact Groups from the account.

In the Edit Notification Class Dialog, selecting an option of the list for Contact Groups displays the details of the Group. Clicking the "Add User" button enables a user to enter a Contact Group name and add User Groups to it. Selecting a Contact Group and clicking the "Remove" button will delete a Contact Group. User Groups can be added to a Contact Group by using the "add" arrow and removed by using the "delete" arrow in the page. Users cannot add or remove User Groups without selecting a Contact Group.

Creation of a customer account may also involve entering a customer service profile that identifies the services to which the customer is subscribing.

The service and account administration function deals with the ongoing administration of a customer's account. Using this function, customers may determine which services they wish to purchase and deploy from Service Provider 126. For example, a customer may have multiple IDC designs in their account, some active, some inactive. Not every IDC will utilize all of the same services. One IDC may have Instant Scaling Services turned on while another IDC may simply be a static IDC. Some IDCs may be utilizing the stress testing service, while others may not.

Accordingly, using the service and account administration function, a customer can display a menu or matrix of the IDC designs a customer has created/had approved, the services applied to the IDCs, and the additional services available to the customer for each of those IDCs. Thus, the service and account administration function acts as an order form for a customer.

The service and account administration function may enable a user to display an online matrix of services to which the user subscribes, and how they relate to IDC versions. It may provide billing reports, online viewing of service level agreements, and contract administration.

5.5 Customer Support Function

In one embodiment, a customer support function provides an interface to a customer care system; case management; a communication hierarchy for different kinds of events and provide multiple media vehicles for customers to be notified of such events; online documentation; online help; a solutions database and lists of frequently asked questions; operational procedures documentation; and contact information for customer service representatives.

A user can access online help by selecting the Support link in the upper right hand corner of a CCC main page and then clicking on a "Documentation" radio button. The user then has access to an interactive help navigation window on the left hand side of the screen that provides a table of contents, an index, and search capabilities. The main view window displays the help topic that the user selects from the navigation window.

5.5.1 Tickets

A tickets page is used to create new tickets, display them based on the status and category, respond to existing ones and close tickets. Tickets are classified in categories. In one embodiment, the tickets page loads with the tickets of category "problem" and that are "open" currently. The user can then query to list tickets of various categories and status values. This page displays a table with the Id, subject, priority, status, type, and category and farm name corresponding to tickets. The table can be sorted on each of these columns. Selecting any of the rows of table causes the system to display the details of corresponding ticket. The user can create a new ticket, respond to one of the displayed ticket and close one of them. The contents of this page can also be printed using the print button on the left bottom corner. The window can be closed using the close button on the right bottom corner. Clicking on the different column headers changes the display order for the tickets so that they are sorted by that field.

A Create New Tickets dialog is used to create a new ticket. All the fields of the dialog are filled in to create a new ticket. A subject field receives information identifying the subject of the ticket. A description field receives information identifying the specific problem or request represented by the ticket. The 'Type' field is selected followed by a selection from the 'Category' field. The list options for the 'Category' field are dependent on the 'Type' field selected.

A Respond to Ticket dialog is used to edit an existing ticket. The page displays the details of a ticket and also allows the user to add notes to a ticket. A Close Ticket dialog displays the details of a ticket and allows the user to enter notes and close the ticket.

5.5.2 Backup/Restore

A request for a 'Restore' of data from a backup device to a farm or IDC may be implemented as a special type of case ticket.

To create a new support ticket that requests a restore operation, a user initiates creation and management of tickets by clicking on the 'Support' link on the Home and Farm Builder or Farm Editor pages. In response, the system opens the Support Main page. To create a new ticket requesting a 'Restore', the user selects the 'New' button. In response, the system displays an 'Open: New Ticket' window. A request to 'Restore' is a special ticket that can be initiated by selecting 'Request' from the 'Type' selection list followed by 'Restore' from the 'Category' list.

To specify the 'Restore' parameters, the user enters a 'Backup Date' value, which is used as the basis for initiating the restore operation. The user also enters a value indicating whether the 'Restore' is intended for 'Direct Attached Storage (DAS)' (backup of disk volumes only, not files) or 'Network Attached Storage (NAS)' (backup of files only). For DAS, the user specifies the Server Group, Server and Disk for the Source of the 'Restore' and for the Destination/Target. For the source, the user enters the name of the Server Group, Server and Disk, as the current configuration of the farm and its nodes, which may have changed since the backup date. Thus, users may keep track of the Server Groups, Servers and Disks that are backed up on a particular date so that they can specify the exact node names for the source of the backup. In addition, for DAS, the user can specify the Source and Destination farms to be different, thus enabling them to copy disk volumes across farms in the same account.

For NAS, the user specifies the 'Destination Directory' as well as the full path names of the files that are requested in the restore request.

6.0 Object Model

An object broker in the form of Persistence Layer 290 is responsible for creating, removing and retrieving programmatic objects that are created according to a specified object model. The object broker may retrieve the model objects by loading them from a custom database, or by interacting with the databases of external systems such as billing system, customer care system, etc. A broker may also create proxies in place of concrete objects to allow lazy loading of model objects and to reduce the large one-time hit of initially loading an entire graph of model objects.

Figure 7:
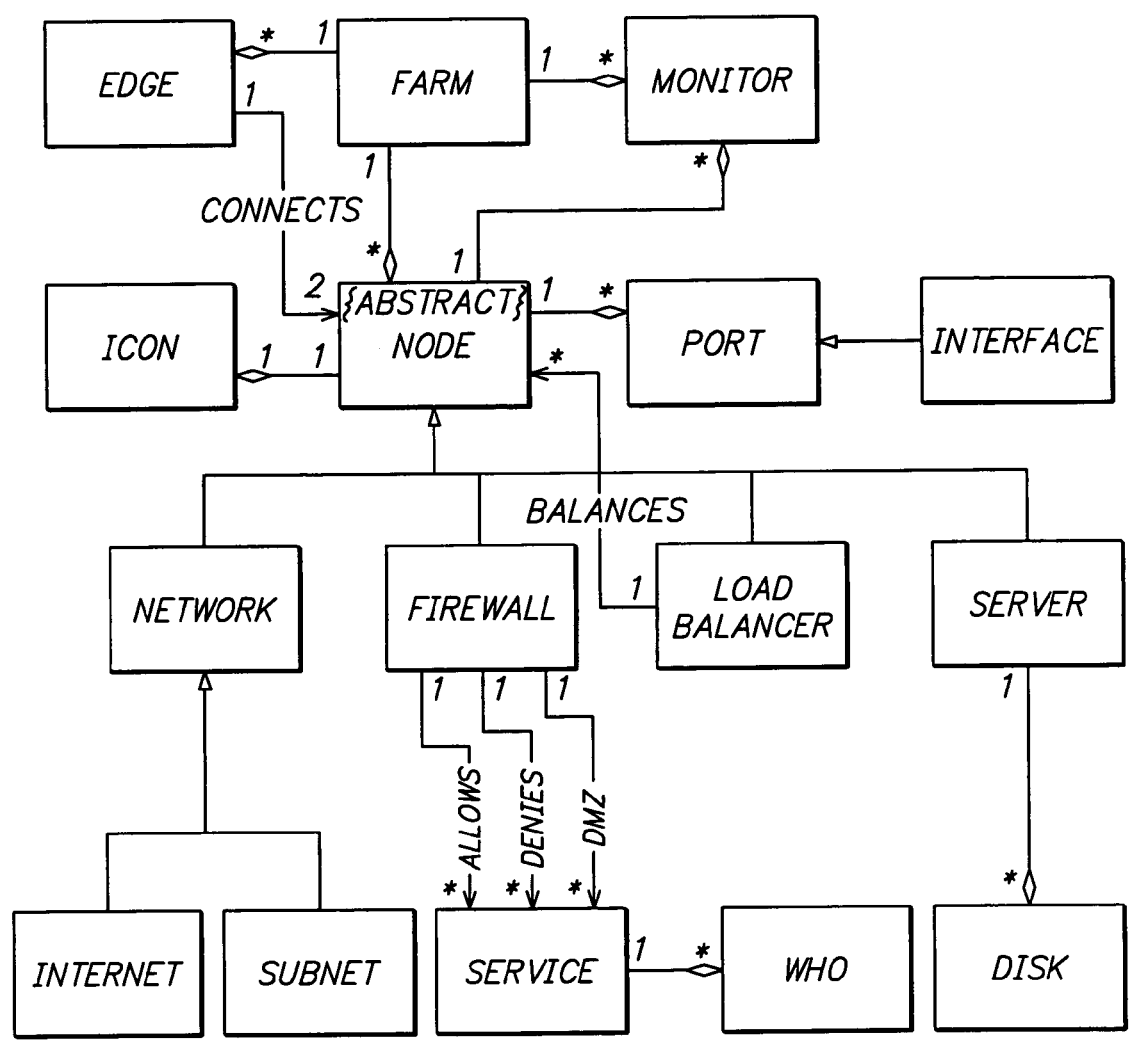
FIG. 7 is a block diagram of an example object model that may be used in an embodiment.

In one embodiment, the editor is implemented in an object-oriented computer programming language, e.g., Java®, C++, etc. The editor creates and stores information according to a pre-defined object model. As the user creates a graphical representation of a data center, the editor creates and stores a representation of the IDC using objects of the object model. FIG. 7 is a block diagram of an example object model that may be used in an embodiment.

7.0 Textual Representation of Instant Data Centers

The invention is related to use of a computer system for creating and storing a definition of a data center in a symbolic definition language. The language expresses the logical structure of a data center in a syntactically concise and consistent manner. The language may be used to describe a data center and its internal components such as servers, load balancers, firewalls, etc. The language provides the ability to describe a data center at a high level of abstraction, in terms of its basic building blocks and their interconnectivity via virtual local area networks (VLANs).

In the language, a data center is defined in terms of its devices and their interconnections. Devices are defined in terms of connectivity to other devices, configuration of the devices, and (for only for devices that are CPUs) roles of the devices. Using the language disclosed herein, internal logical structures of a virtual server farm may be instantiated, modified, and duplicated or "cloned." In a preferred embodiment, the symbolic definition language conforms to a grammar of XML and is defined according to XML DTDs.

Generally, the symbolic definition language presents a farm as a structure composed of devices or sets of devices that have both connectivity information as well as configuration related information. The connectivity information describes how the various devices are interconnected by describing how the device ports are connected to specific VLANs. Each VLAN is referenced using symbolic references that are mapped to specific VLANs when the data center is instantiated in a particular segment of a computing grid, e.g., the type of computing grid described by Aziz, et al.

In an embodiment, a textual representation of a data center is created and stored using statements expressed in a language that is based on Extensible Markup Language (XML) as defined in co-pending application Ser. No. [NUMBER], filed Mar. 26, 2001, entitled SYMBOLIC DEFINITION OF A COMPUTER SYSTEM, and naming Ashar Aziz as inventor, the entire contents of which are hereby incorporated by reference as if fully set forth herein.

In the preferred embodiment, a Farm Editor Markup Language (FEML) is used to describe the topology of a data center. The FEML is defined as a plurality of XML Document Type Definitions (DTDs), as set forth in Table 1. FEML provides an intermediate representation that may be used to transfer information from the editor object model. It is converted into a final representation, Farm Markup Language (FML), for use in implementing a data center.

FIG. 8 is a two-part block diagram that illustrates processes of generating FEML text and FML text based on a JavaScript object model, and the converse process of generating a JavaScript object model based on FML text.

Referring now to FIG. 8(A), a process of generating FML text based on a JavaScript object model is described. At a client 802, a JavaScript object model 806 is created and stored. In the preferred embodiment, client 802 is a browser executed at an end user computer. The JavaScript object model 806 comprises an object representation of a data center that is created and stored by the graphical user interface tool described herein.

Using a client process, which may form part of the graphical user interface tool, text in Farm Editor Markup Language is generated, resulting in creating and storing an FEML object model 808. A JavaScript XML Generator 809 is applied to the FEML object model 808, resulting in creating and storing FEML text 810.

A servlet process 812 transfers a copy of FEML text 810' to server 804. In one embodiment, server 804 is associated with a service provider that implements a computer system based on the FML text and using computing grid elements that are owned, operated, or managed by the service provider. Upon receiving FEML text 810', server 804 applies a Java XML parser 814 to the text, resulting in creating and storing an FEML object model 808'. Normally FEML object model 808' will be a copy of FEML object model 808.

Server 804 then applies an FEML-to-FML converter 816 to the FEML object model 808', resulting in creating and storing an FML object model 818. Server 804 applies a Java XML Generator 819 to the FML object model 818, resulting in creating and storing FML text 820.

In the converse process, shown in FIG. 8(B), the initial input is a set of FML text 820. The Java XML parser 814 is applied to the FML text 820, resulting in creating and storing FML object model 818. An FML to FEML converter process 822 is applied to the FML object model 818, resulting in creating and storing FEML object model 808'. The Java XML Generator 819 is applied to the object model, resulting in creating and storing FEML text 810'.

Servlet 812 passes FEML text 810' from server 804 to client 802, which stores FEML text 810. A JavaScript XML Parser process 824 is applied to FEML text 810, resulting in creating and storing FEML object model 808. Client 802 carries out a Generate-Farm process 826 on FEML object model 808, resulting in creating and storing JavaScript object model 806, which may be imported into and manipulated by the client editor.

8.0 Hardware Overview

Figure 9:
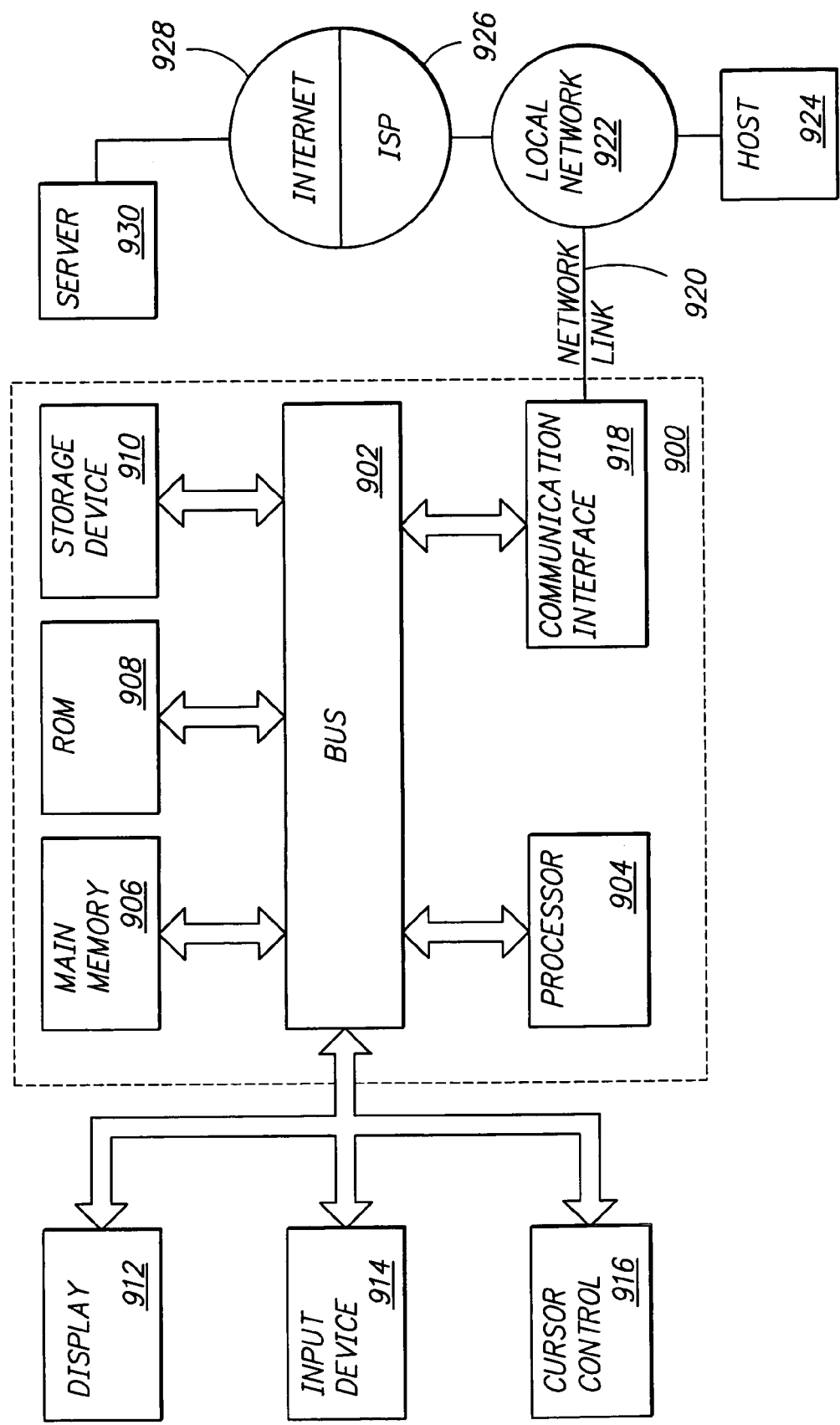
FIG. 9 is a block diagram of a computer system that may be used to implement an embodiment.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for graphically defining and creating a computer system. According to one embodiment of the invention, graphically defining and creating a computer system is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918 are example forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for graphically creating and defining a computer system as described herein. Processor 904 may execute received code as it is received, or stored in storage device 910, or other non-volatile storage for later execution. In this manner, computer system 900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of defining and deploying a networked computer system, the method comprising:

creating and storing a graphical representation of a logical configuration of the networked computer system by
generating a display of a graphical workspace that can receive the graphical representation;
receiving user input representing selecting one or more icons that represent nodes of the networked computer system and moving the one or more icons into the graphical workspace;
receiving user input representing connecting one or more of the icons with one or more other icons;

receiving user input representing configuring one or more parameter values associated with one or more of the nodes; and using the graphical representation, instantiating an operable computer system that conforms to the logical configuration.

2. A method of as recited in claim 1, further comprising based on the graphical representation, automatically creating and storing a textual representation of a logical configuration of the networked computer system, wherein the textual representation conforms to a structured markup language.

3. A method of as recited in claim 1, further comprising based on the graphical representation, generating one or more commands for one or more switch devices that are interconnected to one or more computing elements and storage devices, wherein the commands instruct the switch devices to logically connect the computing elements and storage devices into the operable computer system that conforms to the logical configuration.

4. A method of as recited in claim 1, further comprising the steps of validating the graphical representation to verify that a physical computer system corresponding to the graphical representation may be properly instantiated.

5. A method as recited in claim 1, wherein one or more of the icons each include one or more graphical representations of ports, and further comprising the step of visually highlighting one of the graphical representations of ports when it has a connection to another port.

6. A method as recited in claim 1, further comprising the step of generating a display that includes a palette of the icons, wherein the palette includes icons representing a subnet, a server, a firewall, and a load balancer.

7. A method as recited in claim 1, further comprising the step of generating a display that includes a panel that displays information about the networked computer system that corresponds to the graphical representation, including its state of development and type.

8. A method as recited in claim 1, further comprising the step of generating a display that includes a graphical state icon that visually indicates a current state of the networked computer system that corresponds to the graphical representation.

9. A method as recited in claim 1,
wherein the one or more icons comprise a subnet icon that includes a plurality of connection points,
wherein the step of receiving user input representing moving the one or more icons comprises the step of receiving user input representing expanding the subnet icon, and
further comprising the step of, in response to receiving user input representing expanding the subnet icon, generating an updated display of the subnet icon that includes a larger plurality of connection points.

10. A method as recited in claim 1,
wherein the one or more icons comprise a subnet icon that includes a plurality of connection points,
wherein the step of receiving user input representing moving the one or more icons comprises the step of receiving user input representing contracting the subnet icon, and
further comprising the step of, in response to receiving user input representing contracting the subnet icon, generating an updated display of the subnet icon that includes a smaller plurality of connection points.

11. A method as recited in claim 1, further comprising the steps of:

receiving user input that identifies a disk image by identifying a name of the image, a server of the networked computer system from which to obtain the image, and a disk of the server of the networked computer system from which to obtain the image;

creating and storing information defining a disk image based on the user input and based on contents of the identified disk of the server.

12. A method of graphically defining and deploying a networked computer system, the method comprising:

creating and storing a graphical representation of a logical configuration of the networked computer system;

based on the graphical representation, automatically creating and storing a textual representation of a logical configuration of the networked computer system, wherein the textual representation conforms to a structured markup language; and based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

13. A method as recited in claim 12, wherein creating and storing a textual representation comprises the steps of creating and storing a textual representation of a logical configuration of the networked computer system, wherein the textual representation conforms to a structured markup language, wherein the textual representation includes at least one element defining an automatically created monitor process for monitoring one or more parameters of one or more of the computing elements.

14. A method as recited in claim 12, wherein creating and storing a textual representation comprises the steps of creating and storing a textual representation of a logical configuration of the networked computer system, wherein the textual representation conforms to a structured markup language, wherein the textual representation includes at least one element defining an automatic power management function for one or more of the computing elements.

15. A method as recited in claim 12, wherein the textual representation comprises:
at least one server role definition comprising at least a role name value and a hardware type value; and
one or more definitions of servers of the networked computer system, wherein each definition of a server uses and references the server role definition.

16. A method as recited in claim 12, wherein the textual representation comprises:
at least one server role definition comprising at least a role name value and a hardware type value; and
a plurality of definitions of servers in a server tier of the networked computer system, wherein each definition of a server uses and references the server role definition.

17. A method as recited in claim 12, wherein the textual representation comprises:
at least one definition of a load balancing function;
at least one server tier definition that defines a plurality of servers that receive inbound traffic from the load balancing function; and
at least one fixed server definition that defines a fixed server that is associated with one of the servers in the server tier.

18. A method as recited in claim 12, wherein the textual representation comprises:

at least one server tier definition that defines a plurality of servers that receive inbound traffic from a load balancing function; and at least one definition of the load balancing function, comprising an output port value, an input port value, a virtual address value, a load balancing policy value, and a tier value that identifies the server tier that is managed using the load balancing function.

19. A method as recited in claim 12, wherein the textual representation comprises at least one server tier definition that defines a plurality of servers that receive inbound traffic from the load balancing function; and wherein each server tier definition comprises one or more input port values, a role value, and information specifying a maximum number of physical servers and a minimum number of physical servers for use in a server tier represented by the server tier definition.

20. A method as recited in claim 12, wherein the textual representation comprises at least one fixed server definition that defines a statically addressed server of the networked computer system; and wherein each server definition comprises one or more input port values that identify a virtual local area network, a role value that identifies a processing role carried out by the server, and information specifying a network address of the server.

21. A method as recited in claim 12, further comprising the steps of:

associating a first server definition of the textual representation with a graphical icon, wherein the first server definition comprises at least one external entity declaration that represents a network address of a server that is represented by the first server definition;

creating and storing, in the textual representation, a copied server definition based on duplicating the first server definition that is associated with the graphical icon;

resolving each external entity declaration of the server definition of the textual representation and the copied server definition of the textual representation into a different actual network address;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

22. A method as recited in claim 12, further comprising the steps of:

receiving a first server definition that omits a network address of a server that is represented by the first server definition;

creating and storing, in the textual representation, a copied server definition based on duplicating the first server definition that is associated with the graphical icon;

determining a dynamic network address value for use with the server that is represented by the first server definition;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

23. A method as recited in claim 12, wherein the textual representation comprises at least one firewall definition that comprises a firewall name value, a plurality of port values that define logical connections to a firewall device associated with the firewall definition, and one or more definitions of services that the firewall is allowed to permit or deny.

24. A method as recited in claim 12, wherein the textual representation comprises:

at least one server role definition comprising at least a role name value and a hardware type value;

a disk attribute definition that defines additional local disk storage for the server defined in the server role definition, comprising a drive name value and a drive size value; and one or more definitions of servers of the networked computer system, wherein each definition of a server uses and references the server role definition.

25. A method as recited in claim 12, wherein the textual representation comprises an action definition that defines actions for execution for each server in a tier of one or more servers when an additional server is added to the tier.

26. A method as recited in claim 12, wherein the textual representation comprises an action definition that defines actions for execution for each server in a tier of one or more servers when one of the servers is removed from the tier.

27. A method of defining and deploying a computer system, comprising the steps of:

creating and storing a graphical representation of a logical configuration of the computer system based on selecting one or more first icons representing computing elements of the computer system;

based on the graphical representation, automatically generating one or more commands for one or more switch devices that are interconnected to one or more computing elements and storage devices, wherein the commands instruct the switch devices to logically connect the computing elements and storage devices into an operable computer system that conforms to the logical configuration.

28. A method as recited in claim 27, wherein the first icons include a firewall icon representing a network firewall device.

29. A method as recited in claim 27, wherein the first icons include a load balancer icon representing a load balancing router device.

30. A method as recited in claim 27, further comprising the steps of creating and storing the graphical representation of a logical configuration of the computer system based on also selecting one or more second icons representing network elements of the computer system.

31. A method as recited in claim 30, wherein the second icons include a subnet icon representing a sub-network to which one or more of the first icons are connected.

32. A method as recited in claim 27, further comprising validating the graphical representation of the computer system by verifying that each computing element is properly logically coupled within the graphical representation such that the computer system is likely to operate properly when physically created and activated.

33. A method as recited in claim 27, further comprising validating the graphical representation of the computer system in response to user selection of a validation function, by verifying that each computing element is properly logically coupled within the graphical representation such that the computer system is likely to operate properly when physically created and activated.

34. A method as recited in claim 27, further comprising storing one or more annotations of one or more of the computing elements in response to receiving user input of the annotations.

35. A method as recited in claim 27, further comprising displaying a text view of the computer system, wherein the text view comprises a textual representation of a logical configuration of the computer system, wherein the textual representation conforms to a structured markup language that is automatically created and stored based on the graphical representation.

36. A method as recited in claim 35, further comprising the steps of receiving user input representing a movement of one or more of the first icons; displaying the first icons in modified positions based on the movement; and automatically updating the textual representation to result in creating and storing a modified textual representation that represents the logical configuration of the computer system including the modified positions.

37. A tangible computer-readable medium carrying instructions for defining and deploying a computer system, wherein execution of the instructions by one or more processors causes:
   creating and storing a graphical representation of a logical configuration of the networked computer system;
   based on the graphical representation, automatically creating and storing a textual representation of a logical configuration of the networked computer system, wherein the textual representation conforms to a structured markup language;
   based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

38. A tangible computer-readable medium carrying instructions for defining and deploying a computer system, wherein execution of the instructions by one or more processors causes:
   creating and storing a graphical representation of a logical configuration of the computer system based on selecting one or more first icons representing computing elements of the computer system; and
   based on the graphical representation, automatically generating one or more commands for one or more switch devices that are interconnected to one or more computing elements and storage devices, wherein the commands instruct the switch devices to logically connect the computing elements and storage devices into an operable computer system that conforms to the logical configuration.

39. A tangible computer-readable medium carrying instructions for defining and deploying a networked computer system, wherein execution of the instructions by one or more processors causes:
   creating and storing a graphical representation of a logical configuration of the networked computer system by
      generating a display of a graphical workspace that can receive the graphical representation;
      receiving user input representing selecting one or more icons that represent nodes of the networked computer system and moving the one or more icons into the graphical workspace;
      receiving user input representing connecting one or more of the icons with one or more other icons;
      receiving user input representing configuring one or more parameter values associated with one or more of the nodes; and
   using the graphical representation, instantiating an operable computer system that conforms to the logical configuration.

40. An apparatus for defining and deploying a networked computer system, comprising:
   means for creating and storing a graphical representation of a logical configuration of the networked computer system by
      generating a display of a graphical workspace that can receive the graphical representation;
      receiving user input representing selecting one or more icons that represent nodes of the networked computer system and moving the one or more icons into the graphical workspace;
      receiving user input representing connecting one or more of the icons with one or more other icons;
      receiving user input representing configuring one or more parameter values associated with one or more of the nodes; and
   means for using the graphical representation to instantiate an operable computer system that conforms to the logical configuration.

41. An apparatus for defining and deploying a networked computer system, comprising:
   a processor;
   a network interface accessible to the processor and configured to receive information from a computer network in which the processor participates;
   a tangible computer-readable medium accessible to the processor and carrying instructions defining and deploying a networked computer system, wherein execution of the instructions by the processor causes
   creating and storing a graphical representation of a logical configuration of the networked computer system by
      generating a display of a graphical workspace that can receive the graphical representation;
      receiving user input representing selecting one or more icons that represent nodes of the networked computer system and moving the one or more icons into the graphical workspace;
      receiving user input representing connecting one or more of the icons with one or more other icons;
      receiving user input representing configuring one or more parameter values associated with one or more of the nodes; and
   using the graphical representation, instantiating an operable computer system that conforms to the logical configuration.

* * * * *

UNITED STATES PATENT AND TRADEMARK OFFICE
CERTIFICATE OF CORRECTION

PATENT NO. : 7,093,005 B2 Page 1 of 1
APPLICATION NO. : 09/863945
DATED : August 15, 2006
INVENTOR(S) : Martin Patterson It is certified that error appears in the above-identified patent and that said Letters Patent is hereby corrected as shown below:

COLUMN 47

Claim 37: Line 20, delete "medium" and insert --memory--.

Claim 38: Line 38, delete "medium" and insert --memory--.

Claim 39: Line 54, delete "medium" and insert --memory--.

COLUMN 48

Claim 41: Line 39, delete "medium" and insert --memory--.

Signed and Sealed this

Third Day of April, 2007

JON W. DUDAS
*Director of the United States Patent and Trademark Office*